US008977645B2

(12) United States Patent
Crow et al.

(10) Patent No.: US 8,977,645 B2
(45) Date of Patent: Mar. 10, 2015

(54) ACCESSING A SEARCH INTERFACE IN A STRUCTURED PRESENTATION

(75) Inventors: Daniel N. Crow, New York, NY (US); Daniel Loreto, New Rochelle, NY (US); Antonella Pavese, Norristown, PA (US); Anthony J. Aiuto, Great Neck, NY (US); John Alexander Komoroske, New York, NY (US)

(73) Assignee: Google Inc., Mountain View, CA (US)

( * ) Notice: Subject to any disclaimer, the term of this patent is extended or adjusted under 35 U.S.C. 154(b) by 216 days.

(21) Appl. No.: 12/355,103

(22) Filed: Jan. 16, 2009

(65) Prior Publication Data

US 2010/0185666 A1    Jul. 22, 2010

(51) Int. Cl.
G06F 17/30 (2006.01)
G06F 17/21 (2006.01)

(52) U.S. Cl.
CPC ........ G06F 17/212 (2013.01); G06F 17/30864 (2013.01)
USPC .......................................... 707/770; 707/805

(58) Field of Classification Search
CPC .............. G06F 12/0862; G06F 17/212; G06F 17/30554; G06F 17/30864; G06F 17/30991; G06F 17/3005; G06F 17/3061; G06F 17/30646; G06F 17/30696
USPC .......... 707/770, 790, 805, E17.008; 715/212, 715/273
See application file for complete search history.

(56) References Cited

U.S. PATENT DOCUMENTS

| 3,576,983 A | 5/1971 | Cochran |
| 4,269,492 A | 5/1981 | Engelsmann et al. |
| 4,374,381 A | 2/1983 | Ng et al. |
| 4,797,569 A | 1/1989 | Boyacigiller |
| 4,837,422 A | 6/1989 | Dethloff et al. |
| 4,968,873 A | 11/1990 | Dethloff et al. |
| 5,255,356 A | 10/1993 | Michelman et al. |
| 5,257,353 A | 10/1993 | Blanck et al. |
| 5,263,126 A | 11/1993 | Chang |
| 5,293,319 A | 3/1994 | DeSha et al. |
| 5,308,303 A | 5/1994 | Rawls et al. |
| 5,321,750 A | 6/1994 | Nadan |
| 5,347,580 A | 9/1994 | Molva et al. |
| 5,381,349 A | 1/1995 | Winter et al. |
| 5,387,170 A | 2/1995 | Rawls et al. |

(Continued)

FOREIGN PATENT DOCUMENTS

WO         WO 01/19160         3/2001

OTHER PUBLICATIONS

International Search Report as issued in PCT/US2010/036949 on Jan. 24, 2011.

(Continued)

*Primary Examiner* — Shiow-Jy Fan
(74) *Attorney, Agent, or Firm* — Fish & Richardson P.C.

(57) ABSTRACT

Methods, systems, and apparatus, including computer programs stored on computer storage media, for accessing a search interface from a structured presentation. One aspect can be embodied in machine-implemented methods that include the actions of displaying a structured presentation on a display device, receiving data characterizing a user interaction with the displayed structured presentation, the data including a specification of a first instance and a first attribute of the structured presentation, and displaying a formerly concealed search interface on the display device in response to receiving the data.

30 Claims, 15 Drawing Sheets

(56) References Cited

U.S. PATENT DOCUMENTS

| | | | |
|---|---|---|---|
| 5,396,588 A | 3/1995 | Foressl | |
| 5,448,717 A | 9/1995 | Balmer et al. | |
| 5,473,732 A | 12/1995 | Chang | |
| 5,494,097 A | 2/1996 | Straub et al. | |
| 5,499,366 A | 3/1996 | Rosenberg et al. | |
| 5,560,006 A | 9/1996 | Layden et al. | |
| 5,577,510 A | 11/1996 | Chittum et al. | |
| 5,586,252 A | 12/1996 | Barnard et al. | |
| 5,634,054 A | 5/1997 | Sarachan | |
| 5,671,326 A | 9/1997 | Geisow et al. | |
| 5,682,035 A | 10/1997 | Gallagher et al. | |
| 5,694,608 A | 12/1997 | Shostak | |
| 5,696,962 A | 12/1997 | Kupiec | |
| 5,768,158 A | 6/1998 | Adler et al. | |
| 5,805,164 A * | 9/1998 | Blum et al. | 715/808 |
| 5,870,749 A | 2/1999 | Adusumilli | |
| 5,893,125 A | 4/1999 | Shostak | |
| 5,923,330 A * | 7/1999 | Tarlton et al. | 345/419 |
| 6,003,027 A | 12/1999 | Prager | |
| 6,057,935 A | 5/2000 | Freeman | |
| 6,122,647 A | 9/2000 | Horowitz et al. | |
| 6,298,357 B1 | 10/2001 | Wexler et al. | |
| 6,304,259 B1 | 10/2001 | DeStefano | |
| 6,424,976 B1 | 7/2002 | Jarvis et al. | |
| 6,446,099 B1 | 9/2002 | Peairs | |
| 6,476,827 B1 * | 11/2002 | Porter | 715/738 |
| 6,564,213 B1 | 5/2003 | Ortega et al. | |
| 6,574,628 B1 | 6/2003 | Kahn et al. | |
| 6,647,383 B1 | 11/2003 | August et al. | |
| 6,681,370 B2 | 1/2004 | Gounares et al. | |
| 6,687,689 B1 | 2/2004 | Fung et al. | |
| 6,694,307 B2 | 2/2004 | Julien et al. | |
| 6,704,727 B1 | 3/2004 | Kravets | |
| 6,728,707 B1 | 4/2004 | Wakefield et al. | |
| 6,732,097 B1 | 5/2004 | Wakefield et al. | |
| 6,732,098 B1 | 5/2004 | Wakefield et al. | |
| 6,738,765 B1 | 5/2004 | Wakefield et al. | |
| 6,741,988 B1 | 5/2004 | Wakefield et al. | |
| 6,826,443 B2 | 11/2004 | Makinen | |
| 6,945,458 B1 | 9/2005 | Shah et al. | |
| 7,123,974 B1 | 10/2006 | Hamilton | |
| 7,225,197 B2 | 5/2007 | Lissar et al. | |
| 7,281,245 B2 | 10/2007 | Reynar et al. | |
| 7,325,194 B2 | 1/2008 | Moore et al. | |
| 7,346,629 B2 | 3/2008 | Kapur | |
| 7,356,537 B2 | 4/2008 | Reynar et al. | |
| 7,370,072 B2 | 5/2008 | Jessen | |
| 7,392,479 B2 | 6/2008 | Jones et al. | |
| 7,398,201 B2 | 7/2008 | Marchisio et al. | |
| 7,409,393 B2 | 8/2008 | Gregoire et al. | |
| 7,415,460 B1 | 8/2008 | Phillips et al. | |
| 7,421,645 B2 | 9/2008 | Reynar | |
| 7,526,425 B2 | 4/2009 | Marchisio et al. | |
| 7,526,486 B2 | 4/2009 | Cushman, II et al. | |
| 7,558,841 B2 | 7/2009 | Taboada et al. | |
| 7,562,104 B2 | 7/2009 | Cadiz et al. | |
| 7,593,925 B2 | 9/2009 | Cadiz et al. | |
| 7,672,932 B2 | 3/2010 | Hood et al. | |
| 7,707,024 B2 | 4/2010 | Arayasantiparb et al. | |
| 7,707,496 B1 | 4/2010 | Moore et al. | |
| 7,707,505 B1 | 4/2010 | Ohrt et al. | |
| 7,711,550 B1 | 5/2010 | Feinberg et al. | |
| 7,712,024 B2 | 5/2010 | Reynar et al. | |
| 7,716,163 B2 | 5/2010 | Reynar et al. | |
| 7,716,676 B2 | 5/2010 | Sawicki et al. | |
| 7,734,606 B2 | 6/2010 | Walker | |
| 7,739,588 B2 | 6/2010 | Reynar et al. | |
| 7,742,048 B1 | 6/2010 | Moore et al. | |
| 7,770,102 B1 | 8/2010 | Wolff et al. | |
| 7,778,816 B2 | 8/2010 | Reynar | |
| 7,783,614 B2 | 8/2010 | Jones et al. | |
| 7,788,590 B2 | 8/2010 | Taboada et al. | |
| 7,788,602 B2 | 8/2010 | Reynar et al. | |
| 7,792,818 B2 | 9/2010 | Fain et al. | |
| 7,814,084 B2 | 10/2010 | Hallett et al. | |
| 7,827,164 B2 | 11/2010 | Stevenson | |
| 7,827,546 B1 | 11/2010 | Jones et al. | |
| 7,836,044 B2 | 11/2010 | Kamvar et al. | |
| 7,840,604 B2 | 11/2010 | Zhu et al. | |
| 7,849,048 B2 | 12/2010 | Langseth et al. | |
| 7,849,049 B2 | 12/2010 | Langseth et al. | |
| 7,865,478 B2 | 1/2011 | Badovinatz et al. | |
| 7,895,175 B2 | 2/2011 | Kumar | |
| 7,912,816 B2 | 3/2011 | Guha et al. | |
| 7,992,085 B2 | 8/2011 | Wang-Aryattanwanich et al. | |
| 2001/0025353 A1 | 9/2001 | Jakel | |
| 2001/0032234 A1 | 10/2001 | Summers et al. | |
| 2002/0032671 A1 | 3/2002 | Linuma | |
| 2002/0107853 A1 | 8/2002 | Hofmann et al. | |
| 2002/0111951 A1 | 8/2002 | Zen | |
| 2002/0129011 A1 | 9/2002 | Julien | |
| 2002/0156771 A1 | 10/2002 | Frieder et al. | |
| 2002/0187815 A1 | 12/2002 | Deeds et al. | |
| 2002/0194166 A1 | 12/2002 | Fowler | |
| 2003/0014441 A1 * | 1/2003 | Suzuki et al. | 707/513 |
| 2003/0016943 A1 | 1/2003 | Chung et al. | |
| 2003/0033275 A1 | 2/2003 | Alpha et al. | |
| 2003/0037050 A1 | 2/2003 | Monteverde | |
| 2003/0101052 A1 | 5/2003 | Chen et al. | |
| 2003/0120681 A1 | 6/2003 | Baclawski | |
| 2003/0145004 A1 | 7/2003 | Egilsson et al. | |
| 2003/0188009 A1 | 10/2003 | Agarwalla et al. | |
| 2003/0206201 A1 | 11/2003 | Ly | |
| 2003/0220913 A1 | 11/2003 | Doganata et al. | |
| 2004/0019536 A1 | 1/2004 | Ashkenazi et al. | |
| 2004/0083433 A1 | 4/2004 | Takeya | |
| 2004/0093321 A1 | 5/2004 | Roustant et al. | |
| 2004/0103116 A1 | 5/2004 | Palanisamy et al. | |
| 2004/0117436 A1 | 6/2004 | Newman et al. | |
| 2004/0167870 A1 | 8/2004 | Wakefield et al. | |
| 2004/0167883 A1 | 8/2004 | Wakefield et al. | |
| 2004/0167884 A1 | 8/2004 | Wakefield et al. | |
| 2004/0167885 A1 | 8/2004 | Wakefield et al. | |
| 2004/0167886 A1 | 8/2004 | Wakefield et al. | |
| 2004/0167887 A1 | 8/2004 | Wakefield et al. | |
| 2004/0167907 A1 | 8/2004 | Wakefield et al. | |
| 2004/0167908 A1 | 8/2004 | Wakefield et al. | |
| 2004/0167909 A1 | 8/2004 | Wakefield et al. | |
| 2004/0167910 A1 | 8/2004 | Wakefield et al. | |
| 2004/0167911 A1 | 8/2004 | Wakefield et al. | |
| 2004/0167921 A1 | 8/2004 | Carson et al. | |
| 2004/0181543 A1 | 9/2004 | Wu et al. | |
| 2004/0186826 A1 | 9/2004 | Choi et al. | |
| 2004/0194009 A1 | 9/2004 | LaComb et al. | |
| 2004/0215634 A1 | 10/2004 | Wakefield et al. | |
| 2004/0243560 A1 | 12/2004 | Broder et al. | |
| 2005/0055337 A1 | 3/2005 | Bebo et al. | |
| 2005/0076015 A1 | 4/2005 | Dettinger et al. | |
| 2005/0080771 A1 | 4/2005 | Fish | |
| 2005/0086215 A1 | 4/2005 | Perisic | |
| 2005/0102259 A1 | 5/2005 | Kapur | |
| 2005/0108256 A1 | 5/2005 | Wakefield et al. | |
| 2005/0132274 A1 | 6/2005 | Bodin et al. | |
| 2005/0240984 A1 | 10/2005 | Farr et al. | |
| 2005/0289170 A1 * | 12/2005 | Brown et al. | 707/101 |
| 2006/0004716 A1 | 1/2006 | Hurst-Hiller et al. | |
| 2006/0053383 A1 * | 3/2006 | Gauthier et al. | 715/764 |
| 2006/0074859 A1 | 4/2006 | Gange et al. | |
| 2006/0074868 A1 | 4/2006 | Khaliq et al. | |
| 2006/0095447 A1 | 5/2006 | Dickinson et al. | |
| 2006/0129446 A1 | 6/2006 | Ruhl et al. | |
| 2006/0190436 A1 | 8/2006 | Richardson et al. | |
| 2007/0011150 A1 | 1/2007 | Frank | |
| 2007/0011183 A1 | 1/2007 | Langseth et al. | |
| 2007/0078850 A1 | 4/2007 | Aziz et al. | |
| 2007/0203891 A1 | 8/2007 | Solaro et al. | |
| 2007/0244859 A1 | 10/2007 | Trippe et al. | |
| 2007/0276845 A1 | 11/2007 | Geilich | |
| 2007/0282783 A1 | 12/2007 | Singh | |
| 2008/0097985 A1 | 4/2008 | Olstad et al. | |
| 2008/0114795 A1 | 5/2008 | Agrawal et al. | |
| 2008/0126430 A1 | 5/2008 | Garrett et al. | |
| 2008/0162456 A1 | 7/2008 | Daga et al. | |
| 2008/0228675 A1 | 9/2008 | Duffy et al. | |

(56) References Cited

U.S. PATENT DOCUMENTS

| | | |
|---|---|---|
| 2008/0256023 A1 | 10/2008 | Nair |
| 2008/0301097 A1 | 12/2008 | Parkinson |
| 2010/0161661 A1 | 6/2010 | Hood et al. |
| 2010/0185651 A1 | 7/2010 | Crow et al. |
| 2010/0185653 A1 | 7/2010 | Fortuna et al. |
| 2010/0185654 A1 | 7/2010 | Fortuna et al. |
| 2010/0185934 A1 | 7/2010 | Fortuna et al. |
| 2010/0306223 A1 | 12/2010 | Lee et al. |
| 2011/0106819 A1 | 5/2011 | Brown et al. |

OTHER PUBLICATIONS

Dontcheva, M., Drucker, S., Salesin, D., Cohen, M., "Relations, Cards, and Search Templates: User-Guided Data Integration and Layout," UIST '07, pp. 61-70 (Oct. 7-10, 2007).
B. Amento, L. Terveen, and W. Hill, Experiments in social data mining: The TopicShop system. ACM Trans. on Computer-Human Interaction, pp. 54-85 (2003).
S. Card, G. Roberston, and W. York, "The WebBook and the Web Forager: An information workspace for theWorld-WideWeb," Proc. of SIGCHI, pp. 111-117 (1996).
M. Dontcheva, S. M. Drucker, G.Wade, D. Salesin, and M. F. Cohen, "Summarizing personalWeb browsing sessions," Proc. of UIST, pp. 115-124 (2006).
A. Y. Halevy, A. Rajaraman, and J. J. Ordille. "Data integration: The teenage years," Proc. of VLDB, pp. 9-16 (2006).
A. Hogue and D. Karger, "Thresher: automating the unwrapping of semantic content from the World Wide Web," Proc. of WWW, pp. 86-95 (2005).
D. Huynh, S. Mazzocchi, and D. Karger, "Piggy Bank: Experience the semantic web inside your Web browser," Proc. of ISWC, pp. 413-430 (2005).
U. Irmak and T. Suel, "Interactive wrapper generation with minimal user effort," Proc. of WWW, pp. 553-563 (2006).
T. Kristjansson, A. Culotta, P. Viola, and A. McCallum, "Interactive information extraction with constrained conditional random fields," Proc. of AAAI, pp. 412-418 (2004).
J. Madhavan, S. Cohen, X. L. Dong, A. Y. Halevy, S. R. Jeffery, D. Ko, and C. Yu, "Web-scale data integration: You can afford to pay as you go," Proc. of CIDR, pp. 342-350 (2007).
G. Robertson, M. Czerwinski, K. Larson, D. Robbins, D. Thiel, and M. van Dantzich, "Data mountain: using spatial memory for document management," Proc. of UIST, pp. 153-162 (1998).
M. Schraefel, Y. Zhu, D. Modjeska, D. Wigdor, and S. Zhao, "Hunter Gatherer: interaction support for the creation and management of within-web-page collections," Proc. of WWW, pp. 172-181 (2002).
A. Sugiura and Y. Koseki, "Internet Scrapbook: automating Web browsing tasks by demonstration," Proc. of UIST, pp. 9-18 (1998).
P. Viola and M. Narasimhan, "Learning to extract information from semi-structured text using a discriminative context free grammar," Proc. of SIGIR, pp. 330-337 (2005).
S. Ye, T.-S. Chua, J. Kei, "Querying and Clustering Web Pages about Persons and Organizations," Proceedings of the IEEE/WIC International Conference on Web Intelligence (WI'03) (2003).
International Search Report as issued in PCT/US2010/021290 on Sep. 3, 2010.
K. Tokunaga, et al., "Automatic Discovery of Attribute Words from Web Documents," R. Dale et al. (Eds.):IJCNLP 2005, LNAI 3651, pp. 106-118, 2005, Springer-Verlag, Berlin, Heidelberg 2005.
Chu et al., "A Relational Approach to Inrementally Extracting and Querying Structure Data," VLDB'07, Sep. 23-27, 2007.
International Search Report as issued in PCT/US2006/25810 on Jul. 27, 2007.
International Search Report as issued in PCT/US2006/25811 on Feb. 16, 2007.
Office Action as issued in U.S. App. No. 12/355,228 on Jan. 5, 2011.
Office Action as issued in U.S. App. No. 12/355,459 on Mar. 25, 2011.
Office Action as issued in U.S. App. No. 12/355,554 on May 11, 2011.
Office Action as issued in U.S. App. No. 12/355,607 on Mar. 1, 2011.
Extended European Search Report as issued in Application No. 10732191.1 on May 14, 2013, 6 pages.
ZimZalaBim, "Web Search Engine," Wikipedia, the free encyclopedia, Jan. 13, 2009 [online], [retrieved on May 3, 2013]. Retrieved from the Internet URL:_http://en.wikipedia.org/w/index.php?title=Web_search_engine&oldid=263824777, 5 pages.
Authorized officer Philippe Bécamel, International Preliminary Report on Patentability in PCT/US2010/021290, mailed Jul. 28, 2011, 6 pages.
Authorized officer Athina Nickitas-Etienne, International Preliminary Report on Patentability in PCT/US2010/036949, mailed Dec. 15, 2011, 6 pages.
A Conceptual-Model-Based Computational Alembic for a Web of Knowledge by D.W. Embley, S.W. Liddle, D. Lonsdale, G. Nagy, Y. Tijerino, R. Clawson, J. Crabtree, Y. Ding, P. Jha, Z. Lian, S. Lynn, R.K. Padmanabhan, J. Peters, C. Tao, R. Watts, C. Woodbury, and a. Zitzelberger, ER2008, Oct. 2008. http//www.deg.byu.edu/papers/dke99.pdf).
Barbara et al., Interoperability with unstructured data and services, Research Issues in Data Engineering, 1993: Interoperability in Multidatabase Systems, 1993. Proceedings RIDE-IMS '93, Third International Workshop on, Apr. 19-20, 1993, pp. 123-125.
Extracting Information from Heterogeneous Information Sources Using Ontologically Specified Target Views, by J. Biskup and D.W. Embley, Information Systems, vol. 28, No. 3, 2003, 169-212.
Office Action as issued in U.S. Appl. No. 12/355,228 on Aug. 4, 2011.
Office Action as issued in U.S. Appl. No. 12/355,459 on Nov. 7, 2011.
Office Action as issued in U.S. Appl. No. 12/355,607 on Nov. 1, 2011.
Office Action as issued in U.S. Appl. No. 12/476,110 on Aug. 4, 2011.
Recognizing Ontology-Applicable Multiple-Record Web Documents, by D.W. Embley, Y.-K. Ng, and L. Xu, Proceedings of the 20th International Conference on Conceptual Modeling (er2001), Yokohama, Japan, Nov. 27-30, 2001.
Westermann et al., "The VSBUFFER: Visibility Ordering of Unstructured Volume Primitives by Polygon Drawing," (1997) (http://citeseerx.ist.psu.edu/viewdoc/download;jsessionid=08847506C7710CO023D15EC672071DE58?doi=10.1.1.29.9614&rep=rep1&type=pdf).
Modha, D. S. and Spangler, W. S. 2000. Clustering hypertext with applications to web searching. In Proceedings of the Eleventh ACM on Hypertext and Hypermedia (San Antonio, Texas, United States, May 30-Jun. 3, 2000). Hypertext '00. ACM Press, New York, NY, 143-152. DOI= http://doi.acm.org/10.1145/336296.336351.
Botafogo, R. A. 1993. Cluster analysis for hypertext systems. In Proceedings of the 16th Annual international ACM SIGIR Conference on Research and Development in information Retrieval (Pittsburgh, Pennsylvania, United States, Jun. 27-Jul. 1, 1993). R. Korfhage, E. Rasmussen, and P. Willett, Eds. SIGIR '93. ACM Press, New York, NY, 116-125.
Xiaofeng He; Ding, C.H.Q.; Hongyuan Zha; Simon, H.D., "Automatic topic identification using webpage clustering," Data Mining, 2001. ICDM 2001, Proceedings IEEE International Conference, pp. 195-202, 2001.
Nishino, Fumihito et al., Person and Organization Information Extraction from Newspaper, Information Processing Society of Japan Technical Report, vol. 98, No. 81, Japan, Information Processing Society of Japan, Sep. 18, 1998, pp. 125-132 (English abstract).
Kimura, Rui et al., Generating a dictionary about people based on automatic collection of timeline information, IEICE Technical Report, vol. 106, No. 149, DE2006-50-91, Data Engineering, Japan, The Institute of Electronics, Information and Communication Engineers, Jul. 6, 2006, pp. 41-46 (English abstract).
Yamamoto, Ayumi et al., Automatic Collection of People's Information from the World Wide Web, IEICE Technical Report, vol. 99, No. 534, A199-77-89, Artificial Intelligence and Knowledge Processing, Japan, The Institute of Electronics, Information and Communication Engineers, Jan. 13, 2000 , pp. 93-100 (English abstract).
Japanese Office Action in Japanese Application No. 2011-546411, mailed on Feb. 17, 2014, 9 pages (with English translation).
"Ontology-Based Extraction and Structuring of Information from Data-Rich Unstructured Documents," by D.W. Embley, D.M.

(56) References Cited

OTHER PUBLICATIONS

Campbell, R.D. Smith, and S.W. Liddle. CIKM'98 Proceedings (http://www.deg.byu.edu/papers/cikm98.pdf) (1998), 8 pages.

"A Conceptual-Modeling Approach to Extracting Data from the Web," by D.W. Embley, D.M. Campbell, Y.S. Jiang, Y.-K. Ng, R.D. Smith, S.W. Liddle, and D.W. Quass. ER'98 Proceedings (http://www.deg.byu.edu/papers/er98.pdf) (1998), 20 pages.

"Record Location and Reconfiguration in Unstructured Multiple-Record Web Documents," by D.W. Embley and L. Xu. WebDB'00 Proceedings (http://www.deg.byu.edu/papers/WebDB00.ps) (2000), 6 pages.

\* cited by examiner

ACCESSING A SEARCH INTERFACE IN A STRUCTURED PRESENTATION

REFERENCE TO OTHER APPLICATIONS

This specification refers to the commonly-owned U.S. patent applications entitled "POPULATING A STRUCTURED PRESENTATION WITH NEW VALUES" U.S. patent application Ser. No. 12/355,459 now U.S. Pat. No. 8,412,749), "ADDING NEW INSTANCES TO A STRUCTURED PRESENTATION" U.S. patent application Ser. No. 12/355,554 now U.S. Pat. No. 8,452,791), "RETRIEVING AND DISPLAYING INFORMATION FROM AN UNSTRUCTURED ELECTRONIC DOCUMENT COLLECTION" U.S. patent application Ser. No. 12/355,228), and "ADDING NEW ATTRIBUTES TO A STRUCTURED PRESENTATION" U.S. patent application Ser. No. 12/355,607), all of which are filed on the same day and the contents of all of which are incorporated herein by reference.

BACKGROUND

This specification relates to accessing a search interface in a structured presentation.

An electronic document is a collection of machine-readable data. Electronic documents are generally individual files and are formatted in accordance with a defined format (e.g., PDF, TIFF, HTML, ASCII, MS Word, PCL, PostScript, or the like). Electronic documents can be electronically stored and disseminated. In some cases, electronic documents include audio content, visual content, and other information, as well as text and links to other electronic documents.

Electronic document can be collected into electronic document collections. Electronic document collections can either be unstructured or structured. The formatting of the documents in an unstructured electronic document collection is not constrained to conform with a predetermined structure and can evolve in often unforeseen ways. In other words, the formatting of individual documents in an unstructured electronic document collection is neither restrictive nor permanent across the entire document collection. Further, in an unstructured electronic document collection, there are no mechanisms for ensuring that new documents adhere to a format or that changes to a format are applied to previously existing documents. Thus, the documents in an unstructured electronic document collection cannot be expected to share a common structure that can be exploited in the extraction of information. Examples of unstructured electronic document collections include the documents available on the Internet, collections of resumes, collections of journal articles, and collections of news articles. Documents in some unstructured electronic document collections are not prohibited from including links to other documents inside and outside of the collection.

In contrast, the documents in structured electronic document collections generally conform with formats that can be both restrictive and permanent. The formats imposed on documents in structured electronic document collections can be restrictive in that common formats are applied to all of the documents in the collections, even when the applied formats are not completely appropriate. The formats can be permanent in that an upfront commitment to a particular format by the party who assembles the structured electronic document collection is generally required. Further, users of the collections—in particular, programs that use the documents in the collection—rely on the documents' having the expected format. As a result, format changes can be difficult to implement.

Structured electronic document collections are best suited to applications where the information content lends itself to simple and stable categorizations. Thus, the documents in a structured electronic document collection generally share a common structure that can be exploited in the extraction of information. Examples of structured electronic document collections include databases that are organized and viewed through a database management system (DBMS) in accordance with hierarchical and relational data models, as well as a collections of electronic documents that are created by a single entity for presenting information consistently. For example, a collection of web pages that are provided by an online bookseller to present information about individual books can form a structured electronic document collection. As another example, a collection of web pages that is created by server-side scripts and viewed through an application server can form a structured electronic document collection. Thus, one or more structured electronic document collections can each be a subset of an unstructured electronic document collection.

SUMMARY

This specification describes technologies relating to retrieval and display of information from an unstructured electronic document collection, for example, the electronic documents available on the Internet. Although an electronic document collection may be unstructured, the information content of the unstructured electronic document collection can be displayed in a structured presentation. In particular, the information content of an unstructured electronic document collection can be used not only to determine the values of attributes but also to identify, select, and name attributes and instances in a structured presentation. Such structured presentations can present information in a coherent manner to a user despite the diversity in sources. Examples of structured presentations include tables and other collections of records.

In general, one aspect of the subject matter described in this specification can be embodied in machine-implemented methods that include the actions of displaying a structured presentation on a display device, receiving data characterizing a user interaction with the displayed structured presentation, the data including a specification of a first instance and a first attribute of the structured presentation, and displaying a formerly concealed search interface on the display device in response to receiving the data. The structured presentation visually presents information in a systematic and structured arrangement that conforms with a structured design. The structured presentation denotes associations between an instance and values that characterize attributes of the instance by virtue of an arrangement of an identifier of the instance and the values in a visual presentation of the structured presentation. The search interface includes information or an interactive element identifying location of a first value characterizing the first attribute of the first instance in an electronic document collection.

This and other aspects include one or more of the following features. Receiving the data characterizing the user interaction with the displayed structured presentation can include receiving a manual user specification of the first instance and the first attribute that are associated with a cell in the structured presentation or receiving data characterizing a user interaction with a cell in the structured presentation. The cell can be associated with the first instance and the first attribute by virtue of the arrangement of the cell relative to identifiers of the first instance and the first attribute in the structured presentation. Receiving data characterizing the user interaction with the cell can also include receiving data characterizing the user interaction with an empty cell.

Displaying the formerly concealed search interface can include one or more of the following: displaying an interactive element that can be selected by a user to trigger a search of the electronic document collection to locate the first value; displaying an interactive value entry element that can be selected by a user to specify a value characterizing the first attribute of the first instance; displaying a snippet characterizing a context of the first value in a first document of the electronic document collection; and displaying a result of a prior search of the electronic document collection to locate the first value.

The first value can appear in the structured presentation as a value characterizing the first attribute of the first instance. Displaying the formerly concealed search interface can also include displaying an identifier of a first electronic document in the electronic document collection, wherein the first value is drawn from the first electronic document. The method can also include determining that the first electronic document is inoperative to provide the first value and displaying a visual indication of the inoperativeness of the first document.

The user can be presented with an option to select the first value consistently from a first document regardless of changes in relevancy of the first document to the first instance and the first attribute or with an option to select the first value from a first document that is most relevant to the first instance and the first attribute.

The method of can also include searching an unstructured collection of electronic documents to locate the first value in response to a user interaction with the search interface and adding the first value to the structured presentation. Receiving the specification of the first instance and the first attribute can include receiving a specification of a collection of attributes or a collection of instances. The method can also include updating the display of the structured presentation in response to a passage of a time.

Other embodiments of this aspect include corresponding systems, apparatus, and computer program products.

Another aspect of the subject matter described in this specification can be embodied in a system that includes one or more computers programmed to interact with client devices and to perform operations. The operations include receiving data characterizing user interaction specifying a first cell of a structured presentation displayed on a display device, determining that a prior search has been conducted to populate the first cell with a first value, and, in response to determining that a prior search was conducted, displaying information characterizing the prior search on the display device. The structured presentation visually presents information in a systematic and structured arrangement that conforms with a structured design. The structured presentation denotes associations between an instance and values that characterize attributes of the instance by virtue of an arrangement of the values in cells.

This and other aspects include one or more of the following features. The data characterizing user interaction specifying the first cell can include a manual user specification of the first instance and the first attribute that are associated with the first cell. The information characterizing the prior search can include information identifying an electronic document from which the first value is drawn.

The information characterizing the prior search can include one or more of the following: a collection of electronic documents from which the first value could have been drawn; information identifying a first electronic document in the electronic document collection from which the first value is drawn; and a snippet characterizing a context of the first value in a first document of the electronic document collection. The information characterizing the prior search can be displayed, e.g., in a display element of a formerly concealed search interface.

The operations can also include determining that the first electronic document is inoperable to provide the first value and displaying a visual indication of the inoperability of the first document. The operations can also include updating a display of a value in the first cell of the structured presentation in response to the user interaction. The collection of electronic documents can include electronic documents available on the Internet. The electronic documents can include web pages. The structured presentation can be a collection of cards.

Other embodiments of this aspect include corresponding computer program products, apparatus, and computer program products.

Another aspect of the subject matter described in this specification can be embodied in a system that includes one or more computers programmed to interact with a client device comprising a display device and to perform operations. The operations include displaying a structured presentation on the display device, receiving data characterizing a user interaction with the displayed structured presentation, and displaying a formerly concealed search interface on the display device in response to receiving the data.

The structured presentation visually presents information in a systematic and structured arrangement that conforms with a structured design. The structured presentation denotes associations between an instance and values that characterize attributes of the instance by virtue of an arrangement of an identifier of the instance and the values in a visual presentation of the structured presentation. The data includes a specification of a first instance and a first attribute of the structured presentation. The search interface includes information or an interactive element identifying location of a first value characterizing the first attribute of the first instance in an electronic document collection.

Other embodiments of this aspect include corresponding computer program products, apparatus, and computer program products.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
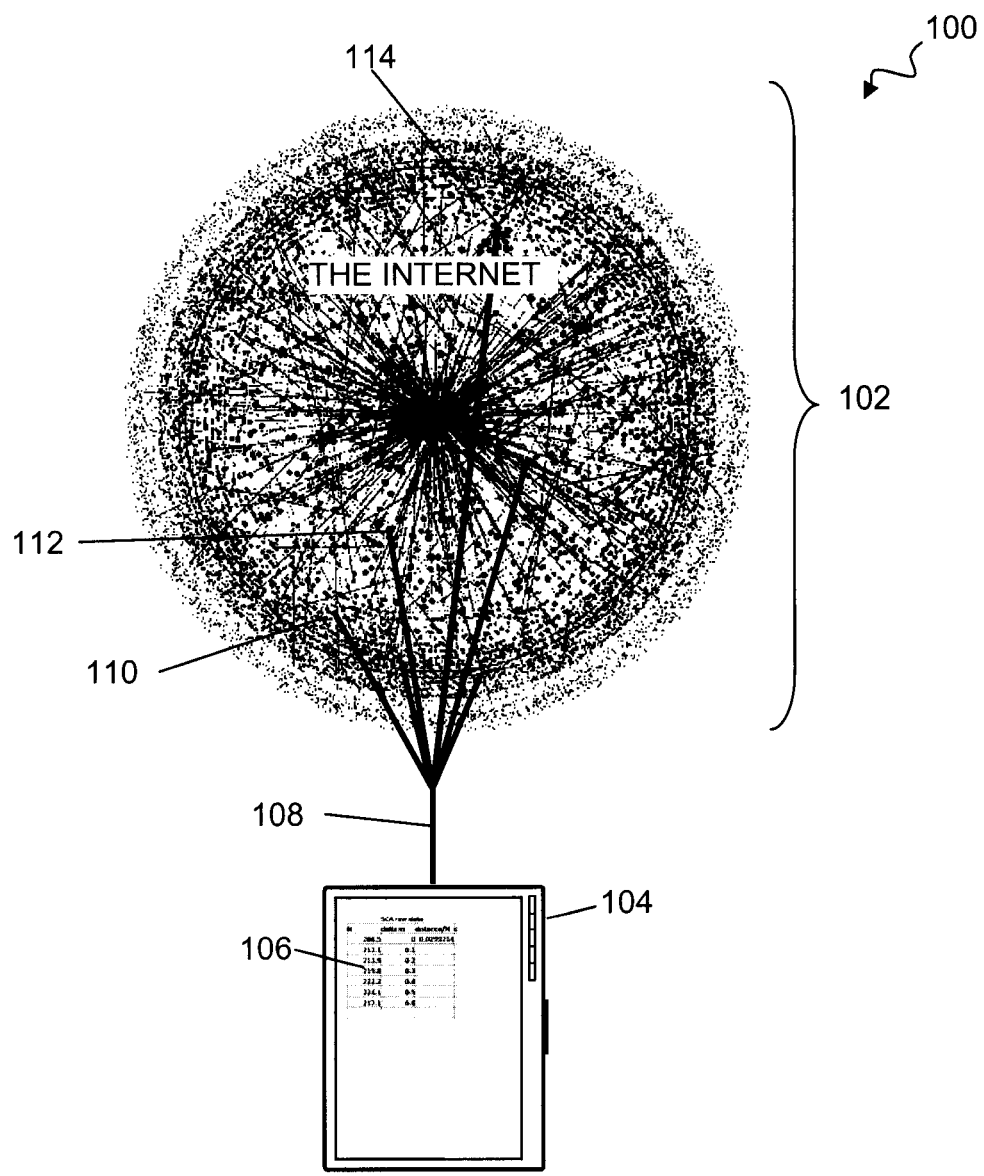
FIG. 1 is a schematic representation of a system in which information from an electronic document collection is presented to a user in a structured presentation.

FIG. 1 is a schematic representation of a system 100 in which information from an unstructured electronic document collection 102 is presented to a user in a structured presentation 106. In addition to electronic document collection 102, system 100 includes a display screen 104 and a data communication infrastructure 108. In operation, system 100 extracts information from unstructured collection of electronic documents 102 and presents the extracted information in a structured presentation 106 on display screen 104.

Electronic document collection 102 is unstructured in that the organization of information within individual documents in electronic document collection 102 need not conform with a predetermined structure that can be exploited in the extraction of information. For example, consider three electronic documents in electronic document collection 102, namely, electronic documents 110, 112, 114. Documents 110, 112, 114 were added to collection 102 by three different users who organize the content of their respective electronic documents differently. The users need not collaborate to ensure that information within documents 110, 112, 114 is in a particular format. Moreover, if one user wishes to change the format of document 110, the user can do so without regard for the format of the documents added by the other users. There is no need for the user to inform the other users of the change. Indeed, in some cases, documents can be added to collection 102 by entities who not only fail to collaborate but who are also competitors who are adverse to one another, such as three different car manufacturers or three different sellers of digital cameras. Regardless of the particular alignment of the entities who add documents to collection 102, no mechanism (e.g., formatting software component or filtering software) is associated with collection 102 that ensures that the information in documents is similarly organized within the documents. Further, no mechanism is associated with collection 102 that ensures that the organization of information in each of each document in collection 102 remains unchanged.

In contrast, structured presentation 106 is structured and presents information drawn from documents in collection 102 in an organized, systematic arrangement. Thus, the grouping, segmentation, and arrangement of information in structured presentation 106 conforms with a structured design even when the information in the presentation is drawn from different contexts in a diverse set of documents in collection 102. Further, changes to any aspect of the design of structured presentation 106 can be propagated throughout structured presentation 106.

Examples of structured presentations include spreadsheet tables, collections of structured cards or other records, and other structured presentation formats. Such structured presentations can also conform with rules that specify the spatial arrangement of information in the displays, the positioning and identification of various organizational and informational aspects (e.g., column headers, row headers, unit identifiers, and the like) of the structured presentations, the graphical representation of values, and other characteristics.

The structuring of information in structured presentations generally facilitates the understanding of the information by a viewer. For example, a viewer can discern the nature of the information contained within the structured presentation by reading headers. A viewer of can easily identify and compare values presented in the structured presentation based on the arrangement and positioning of those values in the display. For example, a user can easily ascertain that certain values in a structured presentation all relate to attributes (i.e., characteristics) of different cars and can easily compare those values.

System 100 is not limited to merely populating structured presentation 106 with values drawn from documents in collection 102. Instead, in many implementations, system 100 can determine entities (i.e., "instances") that are to be described in structured presentation 106, values that characterize the attributes of those instances, as well as an appropriate structuring of structured presentation 106. Such determinations can be based on information drawn from different documents in collection 102 that are not restricted to having a specific format, a permanent format, or both. For example, the attributes that appear in structured presentation 106 can be based on the attributes used in documents in collection 102 to characterize certain instances, as discussed further below. As another example, the units of the values (e.g., meters, feet, inches, miles) that appear in structured presentation 106 can be based on the units of the values that appear in documents in collection 102. As another example, the instances that appear in structured presentation 106 can be determined based on instances that appear in documents in collection 102.

Further, in many implementations, such information can be drawn from previously unspecified documents in collection 102. For example, a search query can be used to identify documents in collection 102 and the information can be drawn from these documents. There need not be preexisting limits on the identity or type of documents from which information can be drawn. For example, the identified documents need not be limited to being associated with the account of a particular individual or originating from a particular retailer. Instead, the information can be drawn from previously unspecified documents.

System 100 can thus exploit the diverse information content of documents in collection 102 in a variety of different ways to present a structured presentation to a user. In cases where electronic document collection 102 includes a large number of documents, the amount of information that can be exploited can be very large. Moreover, in many cases, this can be done automatically or with a relatively small amount of human interaction, as discussed further below.

Figure 2:
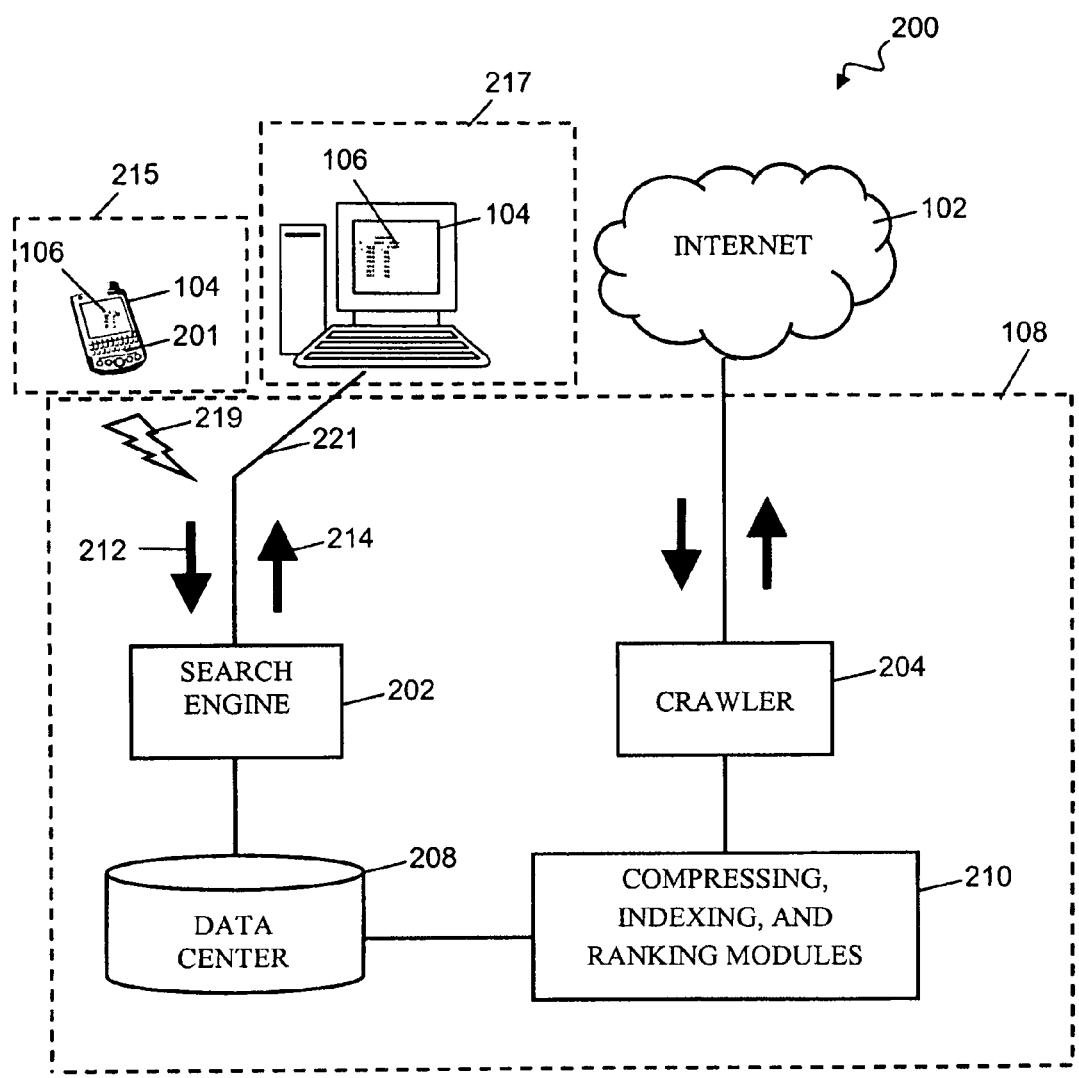
FIG. 2 is a schematic representation of an implementation of another system in which information from an electronic document collection is presented to a user in a structured presentation.

FIG. 2 is a schematic representation of an implementation of a system 200 in which information from an unstructured electronic document collection 102 is presented to a user in a structured presentation 106. In system 200, the data communication infrastructure 108 interconnects electronic document collection 102, display screen 104, and a collection of data storage and processing elements, including a search engine 202, a crawler 204, a data center 208, and document compressing, indexing and ranking modules 210.

Search engine 202 can be implemented on one or more computers deployed at one or more geographical locations that are programmed with one or more sets of machine-readable instructions for searching unstructured electronic document collection 102. Other functionality can be implemented on the one or more computers in addition to the functionality of search engine 202.

Crawler 204 can be implemented on one or more computers deployed at more or more geographical locations that are programmed with one or more sets of machine-readable instructions for crawling unstructured electronic document collection 102. Other functionality can be implemented on the one or more computers in addition to the functionality of crawler 204.

Compressing, indexing, and ranking modules 210 can be implemented on one or more computers deployed at more or more geographical locations that are programmed with one or more sets of machine-readable instructions for compressing, indexing, and ranking documents in collection 102. Other functionality can be implemented on the one or more computers in addition to the functionality of compressing, indexing, and ranking modules 210. The data center 208 stores information characterizing electronic documents in electronic document collection 102. The information characterizing such electronic documents can be stored in the form of an indexed database that includes indexed keywords and the locations of documents in collection 102 where the keywords can be found. The indexed database can be formed, e.g., by crawler 204.

In some implementations, the information stored in data center 208 can itself be organized to facilitate presentation of structured presentation 106 to a user. For example, information can be organized by crawler 204 and compressing, indexing and ranking modules 210 in anticipation of the need to present structured presentations 106 that are relevant to certain topics. The structure of information in data center 208 can facilitate the grouping, segmentation, and arrangement of information in structured presentations 106. This organization can be based on a variety of different factors. For example, an ontology can be used to organize information stored in data center 208. As another example, a historical record of previous structured presentations 106 can be used to organize information stored in data center 208. As another example, the data tables described in this specification can be used to organize information stored in data center 208.

As shown, system 200 includes multiple display screens 104 that can present structured presentations in accordance with machine-readable instructions. Display screens 104 can include, e.g., cathode ray tubes (CRT's), light emitting diode (LED) screens, liquid crystal displays (LCD's), gas-plasma displays, and the like. Display screens 104 can be an integral part of a self-contained data processing system, such as a personal data assistant (PDA) 215, a desktop computer 217, or a mobile telephone. In general, instructions for presenting structured presentations are modified to the particularities of a display screen 104 after receipt by such a self-contained data processing system. However, this is not always the case. For example, display screens 104 can also be part of more disperse systems where the processing of instructions for presenting a structured presentation is completed before the instructions are received at display screen 104. For example, display screens 104 can be incorporated into "dumb" devices, such as television sets or computer monitors, that receive instructions for presenting structured presentation 106 from a local or remote source.

In operation, system 200 can transform the unstructured information in collection 102 into structured presentation 106, which can be presented to a viewer. Such transformations can be performed in the context of web search in which a search engine receives and responds to information requests based on information extracted from the electronic documents in collection 102.

For example, personal digital assistant (PDA) 215 or desktop computer 217 can interact with a user and thereby receive a search query, e.g., by way of a web browser application. A description 212 of the query can be transmitted over a wireless data link 219 and/or a wired data link 221 to search engine 202. In response, search engine 202 can use query description 212 to identify information in data center 208 that can be used in presenting structured presentation 106 on display screen 104. The identified information can be drawn from two or more unspecified electronic documents in unstructured electronic document collection 102. In some instances, query description 212 can include search terms that are used by search engine 202 to retrieve information for presenting a structured presentation 106 to a user. For example, search terms in query description 212 can be used to identify, in data center 208, a collection of related instances, attributes that characterize such instances, value that characterize the individual instances, and/or other aspects of structured presentation 106.

The search engine 202 can also generate a response 214 to query description 212. The response 214 can be used to present structured presentation 106 for a user. In general, response 214 includes machine readable-instructions that can be interpreted by a data processing device in systems 215, 217 to present structured presentation 106. For example, response 214 can be coded in HTML to specify the characteristics and content of structured presentation 106. In other implementations, response 214 can include text snippets or other information from data center 208 that is used in presenting structured presentation 106. For example, response 214 can include a collection of values, the name of a new attribute, or an estimate of the likelihood that a value to be displayed in structured presentation 106 is correct, as discussed further below.

In many cases, system 200 uses the information stored in data center 208 to identify the location of one or more documents that are relevant to the query described in query description 212. For example, search engine 202 can compare the keywords in query description 212 to an index of keywords stored in data center 208. The comparison can be used to identify documents in collection 102 that are relevant to query description 212. The locations of such identified documents can be included in responses 214, e.g., as a hyperlink to the documents that are that are responsive to the described query.

In some implementations, the system 200 can store attributes and/or their respective values in a manner that facilitates the grouping, segmentation, and arrangement of information in structured presentations 106. For example, collections of instances, their attributes, and their values can be stored in data center 208 as structured presentations 106 are amended and changed by users interacting with client systems such as systems 215, 217. For example, instances, attributes, and values in one structured presentation 106 presented to a first viewer can be stored in the data center 208 and used in providing subsequent structured presentations 106 to other viewers.

Figure 3:
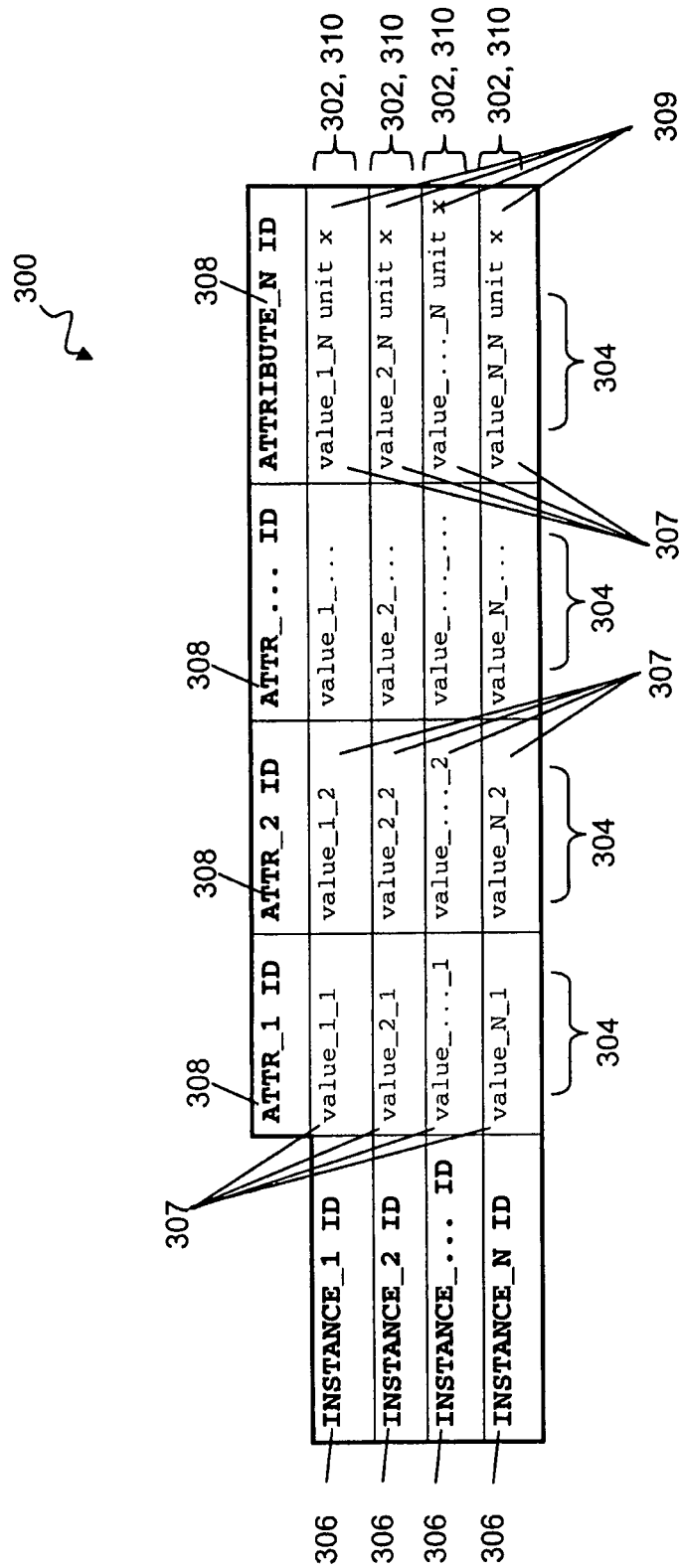
FIGS. 3, 4, and 5 are schematic representations of example structured presentations.

FIG. 3 is a schematic representation of an example structured presentation 106, namely, one that includes a table 300. Table 300 is an organized, systematic arrangement of one or more identifiers of instances, as well as the values of particular attributes of those instances. Instances are individually identifiable entities and generally share at least some common attributes. An attribute is a property, feature, or characteristic of an entity. For example, Tom, Dick, and Harry are instances of individuals. Each such individual has attributes such as a name, a height, a weight, and the like. As another example, city instances each have a geographic location, a mayor, and a population. As yet another example, a product instance can have a model name, a maker, and a year.

The attributes of an instance can be characterized by values. The values of a particular attribute of a particular instance thus characterize that particular instance. For example, the name of an individual can have the value "Tom," the population of a city can have the value "4 million," and the model name of a product can have the value "Wrangler." In some implementations, structured presentations such as table 300 can also include identifiers of attributes, as well as identifiers of the units in which values are expressed.

The grouping, segmentation, and arrangement of information in table 300 can be selected to facilitate understanding of the information by a user. In this regard, table 300 includes a collection of rows 302. Each row 302 includes an instance identifier 306 and a collection of associated attribute values 307. The arrangement and positioning of attribute values 307 and instance identifiers 306 in rows 302 thus graphically represents the associations between them. For example, a user can discern the association between attribute values 307 and the instance identifier 306 that is found in the same row 302.

Table 300 also includes a collection of columns 304. Each column 304 includes an attribute identifier 308 and a collection of associated attribute values 307. The arrangement and positioning of attribute values 307 and attribute identifier 308 in columns 304 thus graphically represent the associations between them. For example, a user can discern the association between attribute values 307 and the attribute identifier 308 that is found in the same column 304 based on their alignment.

Each row 302 is a structured record 310 in that each row 302 associates a single instance identifier 306 with a collection of associated attribute values 307. Further, the arrangement and positioning used to denote these associations in one structured record 310 is reproduced in other structured records 310 (i.e., in other rows 302). Indeed, in many cases, all of the structured records 310 in a structured presentation 106 are restricted to having the same arrangement and positioning of information. For example, values 307 of the attribute "ATTR_2" are restricted to appearing in the same column 304 in all rows 302. As another example, attribute identifiers 308 all bear the same spatial relationship to the values 307 appearing in the same column 304. Moreover, changes to the arrangement and positioning of information in one structured record 310 are generally propagated to other structured record 310 in the structured presentation 106. For example, if a new attribute value 307 that characterizes a new attribute (e.g., "ATTR_2¾") is added to one structured record 310, then a new column 304 is added to structured presentation 106 so that the values of attribute "ATTR_2¾" of all instances can be added to structured presentation 106.

In some implementations, values 307 in table 300 can be presented in certain units of measure. Examples of units of measure include feet, yards, inches, miles, seconds, gallons, liters, degrees Celsius, and the like. In some instances, the units of measure in which values 307 are presented are indicated by unit identifiers 309. Unit identifiers 309 can appear, e.g., beside values 307 and/or beside relevant attribute identifiers 308. The association between unit identifiers 309 and the values 307 whose units of measure are indicated is indicated to a viewer by such positioning. In many cases, all of the values 307 associated with a single attribute (e.g., all of the values 307 in a single column 304) are restricted to being presented in the same unit of measure.

The information extracted from electronic document collection 102 by systems 100, 200 can impact the presentation of table 300 to a user in a variety of different ways. For example, the information extracted from electronic document collection 102 can be used to determine values 307 for populating table 300. As another example, the information extracted from electronic document collection 102 can be used to suggest new attributes and/or new instances for addition to table 300.

In some implementations, instance identifiers 306 can be selected based on one or more search strings. For example, if the search string "hybrid vehicles" is received from a user by search engine 202, systems such as system 200 can generate and populate table 300 based on information extracted from electronic document collection 102 using the search string. For example, system 200 can access data center 208, identify instance identifiers 306 in the electronic documents that are relevant to the search string, determine a set of common attributes for the identified instances—as well as identifiers 308 of those attributes and values 307 for those attributes. In effect, system 200 can determine instance identifiers 306, attribute identifiers 308, as well as the associated values 307 based on the received search string.

In some implementations, one or more attribute identifiers 308, instance identifiers 306, and/or values 307 can be received from a user for whom table 300 is to be displayed. As discussed further below, systems such as system 200 can generate and populate table 300 based on information extracted from electronic document collection 102 using one or more received attribute identifiers 308, instance identifiers 306, and/or values 307. In effect, system 200 can formulate new instance identifiers 306, attribute identifiers 308, as well as the associated values 307 based on the received attribute identifiers 308, instance identifiers 306, and/or values 307.

Figure 4:
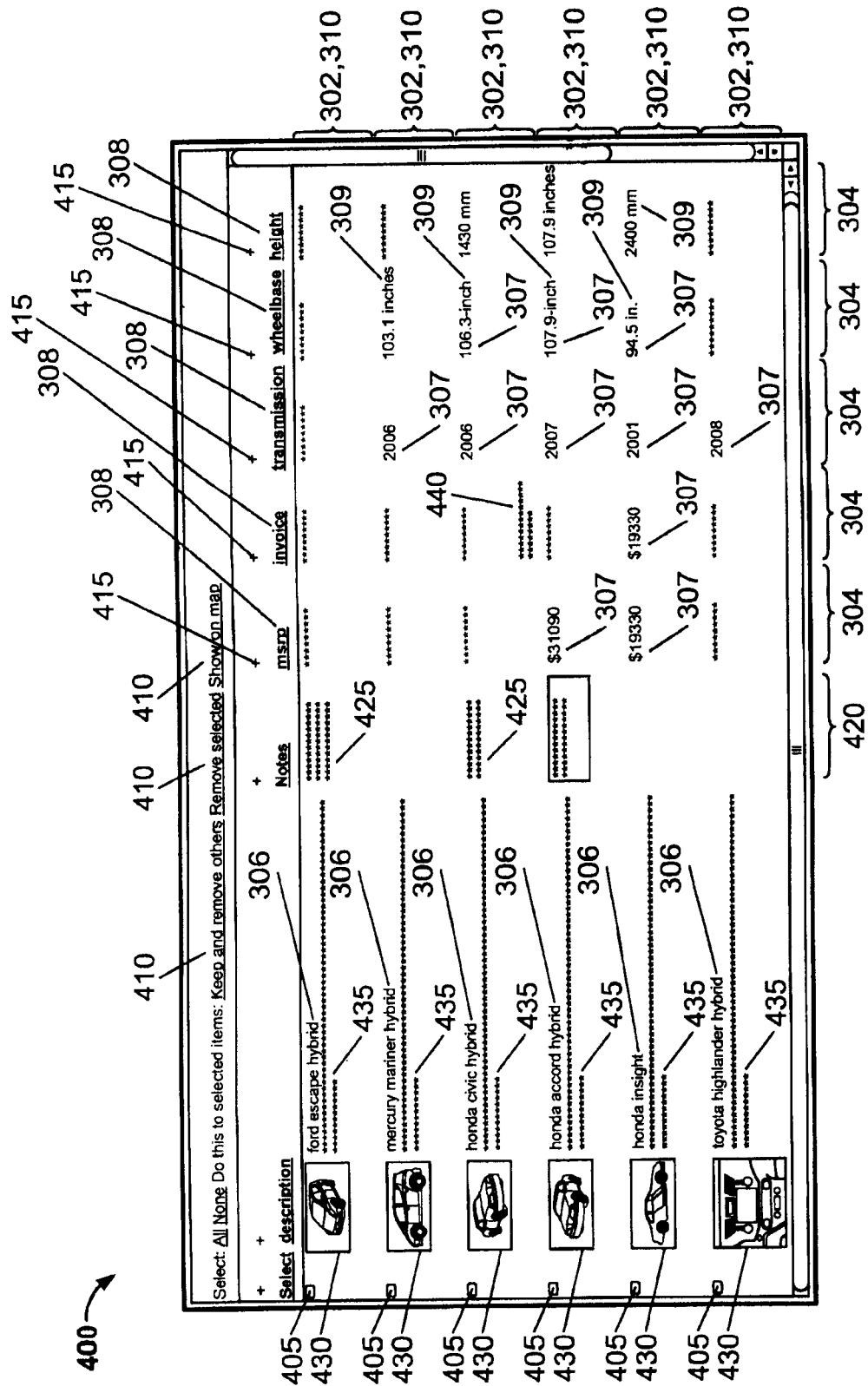

FIG. 4 is a schematic representation of another implementation of a structured presentation, namely, one that includes a table 400. In addition to including attribute identifiers 308, instance identifiers 306, values 307, unit identifiers 309 organized into rows 302 and columns 304, table 400 also includes a number of interactive elements for interacting with a user. In particular, table 400 includes a collection of instance selection widgets 405, a collection of action triggers 410, a collection of column action trigger widgets 415, and a notes column 420.

Instance selection widgets 405 are user interface components that allow a user to select structured records 310 in table 400. For example, instance selection widgets 405 can be a collection of one or more clickable checkboxes that are associated with a particular structured record 310 by virtue of arrangement and positioning relative to that structured record 310. Instance selection widgets 405 are "clickable" in that a user can interact with widgets 405 using a mouse (e.g., hovering over the component and clicking a particular mouse button), a stylus (e.g., pressing a user interface component displayed on a touch screen with the stylus), a keyboard, or other input device to invoke the functionality provided by that component.

Action triggers 410 are user interface components that allow a user to trigger the performance of an action on one or more structured records 310 in table 400 selected using instance selection widgets 405. For example, action triggers 410 can be clickable text phrases, each of which can be used by a user to trigger an action described in the phrase. For example, a "keep and remove others" action trigger 410 triggers the removal of structured records 310 that are not selected using instance selection widgets 405 from the display of table 400. As another example, a "remove selected" action trigger 410 triggers the removal of structured records 310 that are selected using instance selection widgets 405 from the display of table 400. As yet another example, a "show on map" action trigger 410 triggers display of the position of structured records 310 that are selected using instance selection widgets 405 on a geographic map. For example, if a selected instance is a car, locations of car dealerships that sell the selected car can be displayed on a map. As another example, if the selected instances are vacation destinations, these destinations can be displayed on a map.

Column action trigger widgets 415 are user interface components that allow a user to apply an action to all of the cells within a single column 304. When a user interacts with the clickable '+' sign, a further user interface component is displayed which offers to the user a set of possible actions to be performed. The actions in this set can include, e.g., removing the entire column 304 from the structured presentation 400 or searching to find values for all the cells in column 304 which are currently blank.

Notes column 420 is a user interface component that allows a user to associate information with an instance identifier 306. In particular, notes column 420 includes one or more notes 425 that are each associated with a structured record 310 by virtue of arrangement and positioning relative to that structured record 310. The information content of notes 425 is unrestricted in that, unlike columns 304, notes 425 are not required to be values of any particular attribute. Instead, the information in notes 425 can characterize unrelated aspects of the instance identified in structured record 310.

In some implementations, table 400 can include additional information other than values of any particular attribute. For example, table 400 can include a collection of images 430 that are associated with the instance identified in a structured record 310 by virtue of arrangement and positioning relative to that structured record 310. As another example, table 400 can include a collection of text snippets 435 extracted from electronic documents in collection 102. The sources of the snippets can be highly ranked results in searches conducted using instance identifiers 306 as a search string. Text snippets 435 are associated with the instance identified in a structured record 310 by virtue of arrangement and positioning relative to that structured record 310.

As another example, table 400 can include one or more hypertext links 440 to individual electronic documents in collection 102. For example, the linked documents can be highly ranked results in searches conducted using instance identifiers 306 as a search string. As another example, the linked documents can be source of a value 307 that was extracted to populate table 400. In some instances, interaction with hypertext link 440 can trigger navigation to the source electronic document based on information embedded in hypertext link 440 (e.g., a web site address).

Figure 5:
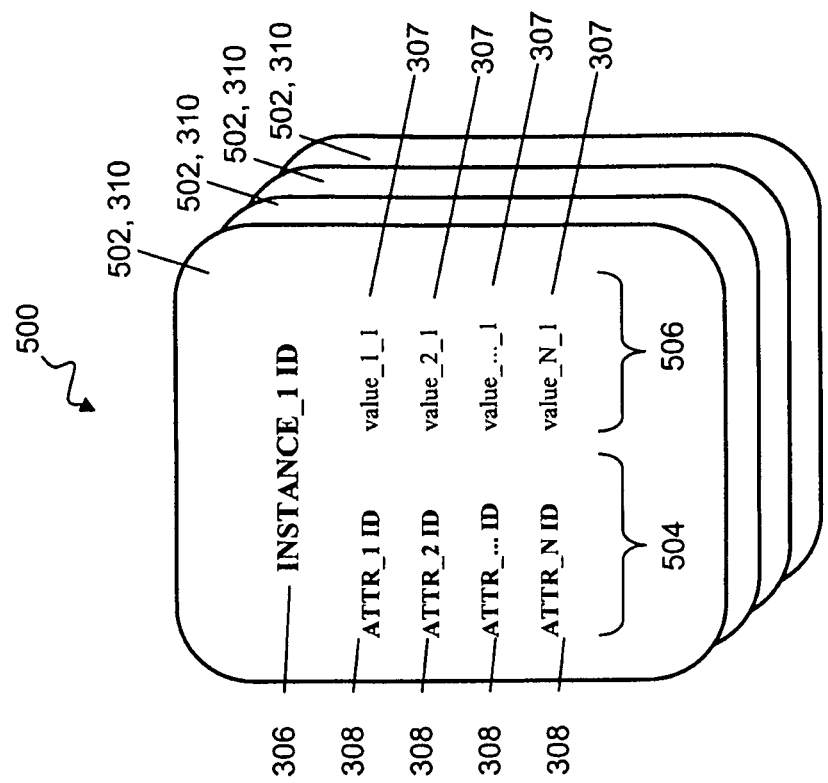

FIG. 5 is a schematic representation of another implementation of a structured presentation, namely, a collection of cards 500. Card collection 500 is an organized, systematic arrangement of one or more identifiers of instances, as well as the values of particular attributes of those instances. The attributes of an instance can be specified by values. Moreover, card collection 500 generally includes identifiers of attributes, as well as identifiers of the units in which values are expressed, where appropriate.

The grouping, segmentation, and arrangement of information in card collection 500 can be selected to facilitate an understanding of the information by a user. In this regard, card collection 500 includes a collection of cards 502. Each card 502 includes an instance identifier 306 and a collection of associated attribute values 307. The arrangement and positioning of attribute values 307 and instance identifiers 306 in cards 502 thus graphically represents the associations between them. For example, a user can discern the association between attribute values 307 and the instance identifier 306 that is found on the same card 502.

In the illustrated implementation, cards 502 in card collection 500 also include a collection of attribute identifiers 308. Attribute identifiers 308 are organized in a column 504 and attribute values 307 are organized in a column 506. Columns 504, 506 are positioned adjacent one another and aligned so that individual attribute identifiers 308 are positioned next to the attribute value 307 that characterizes that identified attribute. This positioning and arrangement allows a viewer to discern the association between attribute identifiers 308 and the attribute values 307 that characterize those attributes.

Each card 502 is a structured record 310 in that each card 502 associates a single instance identifier 306 with a collection of associated attribute values 307. Further, the arrangement and positioning used to denote these associations in one card 502 is reproduced in other cards 502. Indeed, in many cases, all of the cards 502 are restricted to having the same arrangement and positioning of information. For example, the value 307 that characterizes the attribute "ATTR_1" is restricted to bearing the same spatial relationship to instance identifiers 306 in all cards 502. As another example, the order and positioning of attribute identifiers 308 in all of the cards 502 is the same.

Moreover, changes to the arrangement and positioning of information in one card 502 are generally propagated to other cards 502 in card collection 500. For example, if a new attribute value 307 that characterizes a new attribute (e.g., "ATTR_1¾") is inserted between the attribute values "value_1_1" and "value_2_1" in one card 502, then the positioning of the corresponding attribute values 307 in other cards 502 is likewise changed.

In some implementations, cards 502 in card collection 500 can include other features. For example, cards 502 can include interactive elements for interacting with a user, such as instance selection widgets, action triggers, attribute selection widgets, a notes entry, and the like. As another example, cards 502 in card collection 500 can include additional information other than values of any particular attribute, such as images and/or text snippets that are associated with an identified instance. As another example, cards 502 in card collection 500 can include one or more hypertext links to individual electronic documents in collection 102. Such features can be associated with particular instances by virtue of appearing on a card 502 that includes an instance identifier 306 that identifies that instance.

During operation, a viewer can interact with the system presenting card collection 500 to change the display of one or more cards 502. For example, a viewer can trigger the side-by-side display of two or more of the cards 502 so that a comparison of the particular instances identified on those cards is facilitated. As another example, a viewer can trigger a reordering of card 502, an end to the display of a particular card 502, or the like. As another example, a viewer can trigger the selection, change, addition, and/or deletion of attributes and/or instances displayed in cards 502. As yet another example, a viewer can trigger a sorting of cards into multiple piles according to, e.g., the values of an attribute values 307 in the cards.

In some implementations, cards 502 will be displayed with two "sides." For example, a first side can include a graphic representation of the instance identified by instance identifier 306, while a second side can include instance identifier 306 and values 307. This can be useful, for example, if the user is searching for a particular card in the collection of cards 500, allowing the user to identify the particular card with a cursory review of the graphical representations on the first side of the cards 502.

Figure 6:
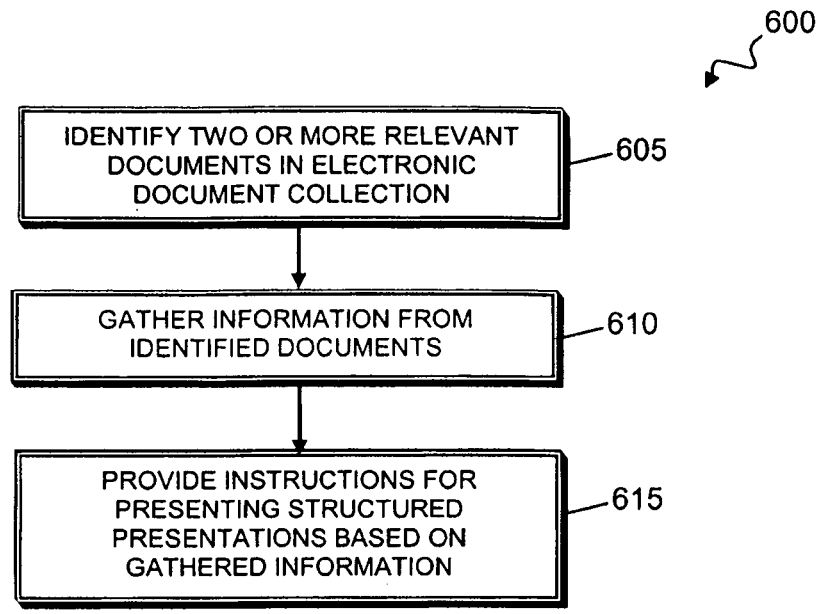
FIG. 6 is a flow chart of a process for presenting information from an electronic document collection to a user in a structured presentation.

FIG. 6 is a flow chart of a process 600 for presenting information from an electronic document collection to a user in a structured presentation. Process 600 can be performed by one or more computers that perform operations by executing one or more sets of machine-readable instructions. For example, process 600 can be performed by the search engine 202 in system 200. In some implementations, process 600 can be performed in response to the receipt of a trigger, such as a user request to create or change a structured presentation.

The system performing process 600 can identify two or more responsive electronic documents in the electronic document collection (step 605). The responsive documents can be identified in a number of different ways. In some instances, documents are identified based on "new" information—such as, e.g., a new search query—received from viewer. For example, the system can compare a newly received search query with the content of the electronic documents in the electronic document collection using string comparisons. As another example, the system can access a data center such as data center 208 and compare the terms in a search query with an index of keywords to identify the location of responsive electronic documents.

In some instances, documents are identified based on "old" information that is already found in a structured presentation. Among the information found in a structured presentation are the identities of instances, attributes, values, and the units in which the values are represented. The system performing process 600 can use this old information to identify responsive electronic documents in the electronic document collection. For example, documents that include instances already found in a structured presentation can be identified as responsive. As another example, documents that characterize instances using attributes already found in a structured presentation can be identified as responsive. Additional examples of such identifications are discussed further below.

The system performing process 600 can also gather information from the identified electronic documents (step 610). The gathered information can regard one or more instances, attributes, and/or values. The system performing process 600 can gather this information directly from the documents in an electronic document collection or from previously assembled collections of information that characterize the electronic documents in an electronic document collection. For example, in the context of system 200 (FIG. 2), the system performing process 600 can locate documents in collection 102, access the located documents, and extract the information directly from the original documents in collection 102. As another example in the context of system 200 (FIG. 2), the system performing process 600 can access a collection of information in data center 208 and gather the information from, e.g., a database that includes an index of keywords and the location of documents that include those keywords, an ontology, and/or a historical record of previous structured presentations that were presented using information extracted from documents in collection 102.

The system performing process 600 can use the gathered information to provide instructions for presenting structured presentations based on the gathered information (step 615). For example, the system performing process 600 can generate machine-readable instructions for presenting a structured presentation such as tables 300, 400 or collection of cards 500.

Figure 7:
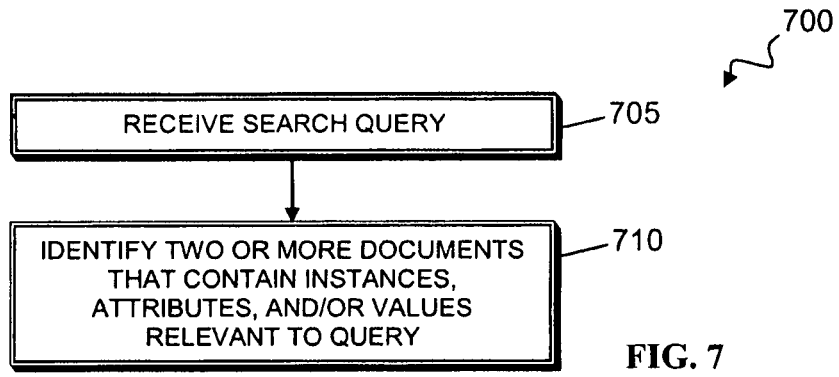
FIGS. 7 and 8 are flow charts of example processes for identifying two or more relevant documents in an electronic document collection.

FIG. 7 is a flow chart of a process 700 for identifying responsive documents in an electronic document collection. Process 700 can be performed in isolation or in conjunction with other data processing activities. For example, process 700 can be performed in conjunction with identifying two or more responsive electronic documents in the electronic document collection (step 605) in process 600 (FIG. 6).

The system performing process 700 receives a search query (step 705). For example, the system can receive one or more search strings (e.g., "hybrid vehicles") from a user. As another example, the system can receive a search string from another process or system. In some implementations, the search string is received through an application programming interface (API), a common gateway interface (CGI) script, or other programming interfaces. In other implementations, the search string is received through a web portal, a web page, or web site, or the like.

In response, the system performing process 700 identifies two or more documents that contain instances, attributes, and/or values that are responsive to the search query (step 710). The documents can be identified by classifying the role that terms in the search query are to play in a structured presentation. For example, the terms in a search query can be classified as a categorization of the instances that are to appear in a structured presentation based on, e.g., the particular terms in the search query, an express indication by the user as to how search query terms are to be classified, and/or the context of the search. By way of example, the terms in a search query "cities in California" can be classified as a categorization of instances such as "San Diego," "Los Angeles," and "Bakersfield" due to the plural term "cities" being characterized by an attribute, namely, being "in California." As another example, the terms in a search query "Ivy League schools" can be classified as categorization of instances (such as "Cornell," "Columbia," and "Brown") due to the plural term "schools" being characterized by an attribute "Ivy League."

In some cases, additional information must be used to classify the terms in a search query. For example, the search query "Ivy League" can reasonably be taken as a categorization of school instances or as an example instance of the category "athletic conferences" which includes instances such as "Atlantic Coast Conference" and "PAC-10." In such cases, the terms can be classified, e.g., based on an express indication by the user as to how they are to be classified or based on the context of the terms in a search session. For example, if a user had previously entered the phrases "Atlantic Coast Conference" and "PAC-10" as search queries, the search query "Ivy League" can be taken as an example instance that is to appear in a structured presentation alongside those other instances.

The documents can be identified either directly in electronic document collection 102 or indirectly based on information in electronic data center 208. Such identifying information can include, e.g., the URL where the document was found the last time it was crawled.

Figure 8:
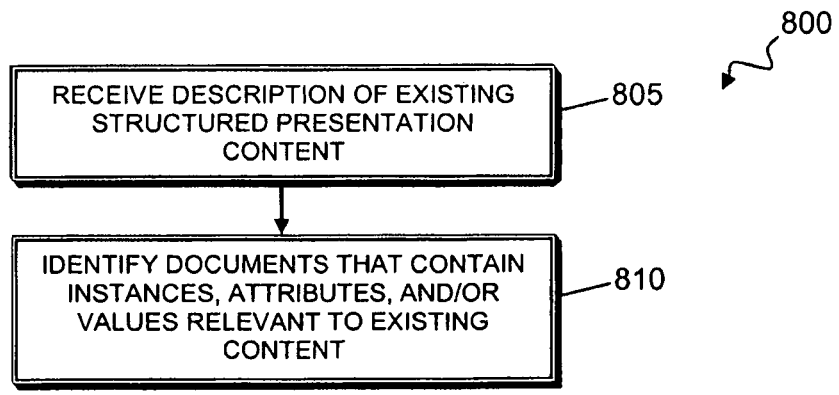

FIG. 8 is a flow chart of another example process 800 for identifying two or more responsive documents in an electronic document collection. Process 800 can be performed in isolation or in conjunction with other data processing activities. For example, process 800 can be performed in conjunction with identifying two or more responsive electronic documents in the electronic document collection (step 605) in process 600 (FIG. 6). As another example, process 800 can be performed in conjunction with process 700 for identifying responsive documents in an electronic document collection at step 605 in process 600 (FIG. 6). For example, processes 700, 800 can be part of an iterative, interactive process in which a search query is received and used to identify a first collection of responsive documents, a first structured presentation that includes content drawn from the identified documents is presented to a user, user modifications are received, and a description of the modified structured presentation is used to identify a second collection of relevant documents. In some implementations, process 800 can be performed several times. In some implementations, process 800 can be performed without user input, e.g., by crawler 206 in system 200 (FIG. 2).

The system performing process 800 receives a description of existing content of a structured presentation (step 805). In particular, the system can receive a description of the instances, the attributes, the values, and/or the units in which values are presented in an existing structured presentation. The description can include, e.g., identifiers of the instances and the attributes and/or ranges of the values of the attributes. The description can also include a categorization of the instances and/or attributes. Such a categorization can be determined, e.g., using an ontology or based on a categorization assigned by a viewer to a structured presentation. For example, if a user entitles a structured presentation "Ivy League Schools," then this title can be taken as a categorization of the instances in that structured presentation.

In response, the system performing process 800 can identify one or more documents that contain instances, attributes, and/or values that are relevant to the existing content (step 810). For example, the system can compare the identifiers of instances and/or attributes to indexed keywords to determine if particular documents contain one or more of the instances and/or attributes that already appear in the existing content of a structured presentation. As another example, the system can identify new instances, their attributes, and the values of such attributes from such documents, compare these values to values that already appear in the existing content of a structured presentation, and determine whether the new instances are potentially relevant to the to the existing content of the structured presentation.

The documents can be identified either directly in electronic document collection 102 or using identifying information in electronic data center 208. Such identifying information can include, e.g., the memory location where the document was found the last time it was crawled.

Figure 9:
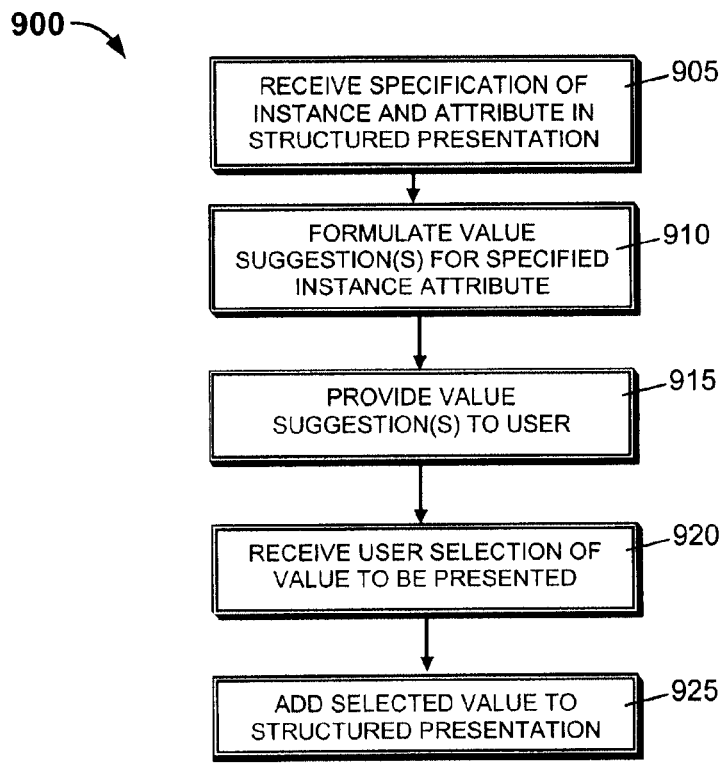
FIG. 9 is a flow chart of a process for adding values to a structured presentation based on the content of documents in an electronic document collection.

FIG. 9 is a flow chart of a process 900 for adding values to a structured presentation based on the content of documents in an electronic document collection. Process 900 can be performed by a system of one or more computers that perform operations by executing one or more sets of machine-readable instructions. For example, process 900 can be performed by the search engine 202 in system 200. Process 900 can be performed in isolation or in conjunction with other activities. For example, process 900 can be performed as part of one or more of processes 600, 700, 800 (FIGS. 6, 7, 8).

In some implementations, process 900 can be performed in response to receiving input, e.g., from a user or from another system or process that triggers the creation of a new structured presentation or an update of the structured presentation. For example, process 900 can be performed in response to a user request that one or more new attributes be added to a structured presentation 106. As another example, process 900 may be performed by a search engine, such as search engine 202 (FIG. 2), in response to receipt of a search query.

The system performing process 900 can receive a specification of an instance and an attribute in a structured presentation (step 905). The structured presentation can be a new or a preexisting structured presentation. For example, the system can receive a search query specifying instances, or a category of instances, that are to be characterized in a structured presentation.

As another example, a user can interact with a preexisting structured presentation to specify an instance, and attribute, or both. User interaction with a preexisting structured presentation can specify an instance and/or an attribute inherently or manually. Inherent specification draws upon the systematic arrangement of instance and attribute identifiers in a structured display so that user interaction with a cell specifies an instance and an attribute associated with that cell.

In contrast, in manual specification, a user manually identifies which cells include the identifiers of instances and attributes that are associated with a cell. For example, a user can enter a search query into a cell that specifies the arrangement of an instance identifier, an attribute identifier, or both within the structured presentation. For example, a search query that includes the formula "(CELL_1, CELL_2)" can specify that this cell is associated with the attribute identified in cell "CELL_2" of the instance identified in cell "CELL_1" and that a search for this attribute of this instance is to be conducted. Such manual specification of instance and attribute identifiers is particularly useful in structured presentations such as spreadsheet tables, where the position of instance and attribute identifiers may be apparent to a user but unknown to a data processing device that presents a structured presentation. Further examples of user interaction with a preexisting structured presentation to specify one or more instances and attributes are discussed in detail below.

The system performing process 900 can formulate one or more value suggestions from documents in an electronic document collection for the specified attribute of the instance (step (910). Value suggestions can be formulated for the specified attribute in a number of different ways. For example, in one implementation, the system can formulate value suggestions from documents in an electronic document collection 102 by conducting a search using a search query that is constructed using the specified instance and attribute. For example, value suggestions can be formulated by, e.g., locating documents that include structured components related to the specified instance and attribute as discussed in the commonly-owned U.S. patent application entitled "POPULATING A STRUCTURED PRESENTATION WITH NEW VALUES" Ser. No. 12/355,459, the disclosure of which is incorporated by reference herein.

As another example, a search query can require that identifiers of the specified instance and attribute be found in a linguistic pattern indicating that a value characterizing the attribute of the instance is likely to appear. Examples of such patterns include "the <attribute> of <entity> is," "<entity> with an <attribute> of," "<entity> has an <attribute> of," "<entity>'s <attribute> is," and the like. Such patterns can be used to extract value suggestions from textual content in electronic documents.

The system performing process 900 can provide one or more value suggestions to a user (step 915). For example, a list of value suggestions can be displayed for the user on the same display screen that displays a preexisting structured presentation. The display of a list of value suggestions can be done before a value is selected for addition to the preexisting structured presentation.

As another example, in some implementations, the value suggestions can be concealed, along with search information and interactive elements, in a structured presentation. Examples of such implementations are discussed further below.

The system performing process 900 can receive a user selection of a value suggestion that is to be presented in a structured display (step 920). For example, an interactive element can interact with a user to receive one or more user inputs (e.g., mouse clicks, key strokes, or other user input) that select a value suggestion. In some implements, the interactive element can be concealed in a structured presentation, as discussed further below. The system performing process 900 can also add the selected value to a structured presentation (step 925) to display the selected value in the structured presentation.

Figure 10:
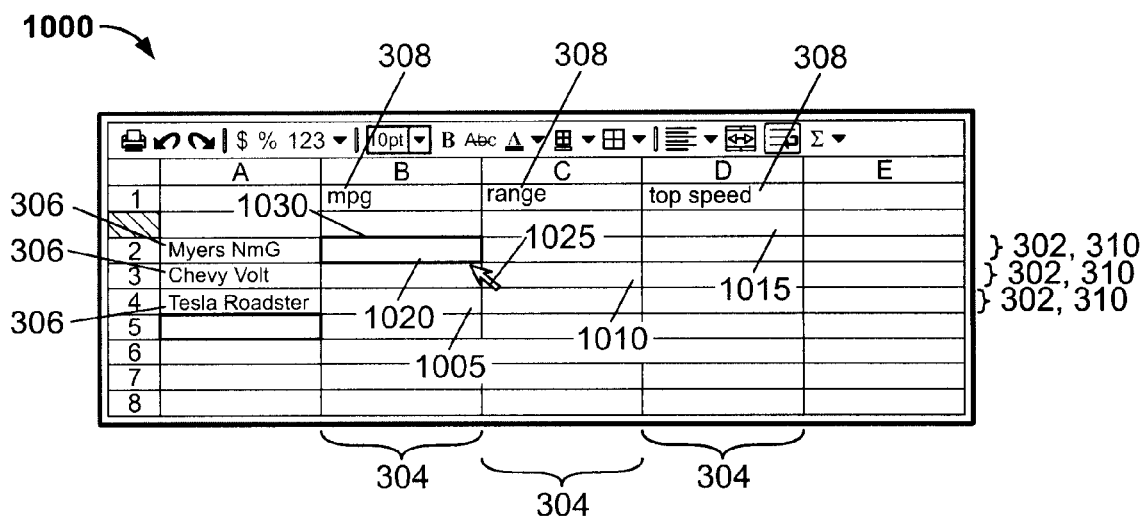
FIGS. 10, 11, and 12 are schematic representations of structured presentations in which a search interface is concealed.

FIG. 10 is a schematic representation of a structured presentation in which a search interface is concealed, namely, a structured presentation 1000. A search interface can include search information, one or more search interactive elements, or a combination thereof. Interactive elements are components of a graphical user interface that can interact with a user, e.g., to receive input instructions. Search interactive elements and search information are relevant to a search. A search is the process of locating information in an electronic document collection. A search interface can include, e.g., information indicating the availability of a search to populate a structured presentations with values, an interactive element that allows a user to indicate that such a search is to be conducted, a display identifying electronic documents located during a search, an interactive element that allows a user to select from among electronic documents for populating a structured presentation with values, or combinations of these and other features.

Structured presentation 1000 can be any form of structured presentation, including any of the structured presentations discussed above. For example, structured presentation 1000 can be a data table displayed in a spreadsheet framework, as shown. The data table of structured presentation 1000 includes a collection of rows 302 and columns 304. Each row 302 includes a respective instance identifier 306 and each column 304 includes a respective attribute identifier 308. The arrangement and positioning of instance identifiers 306 and attribute identifiers 308 in rows 302 and columns 304 associates each cell of the spreadsheet framework in which structured presentation 1000 is displayed with an instance and an attribute. For example, a cell 1005 in structured presentation 1000 is associated with the instance identified as "Tesla Roadster" and the attribute identified as "mpg." A cell 1010 in structured presentation 1000 is associated with the instance identified as "Chevy Volt" and the attribute identified as "range." A cell 1015 in structured presentation 1000 is associated with the instance identified as "Myers NmG" and the attribute identified as "top speed." A cell 1020 in structured presentation 1000 is associated with the instance identified as "Myers NmG" and the attribute identified as "mpg."

The associations between instance, attributes, and cells such as cells 1005, 1010, 1015, 1020 can be used to receive a specification of an instance and an attribute from a user. For example, receipt of user interaction selecting cell 1020 can be taken as input specifying the instance identified as "Myers NmG" and attribute identified as "mpg." User interaction selecting a cell can include, e.g., receipt of input positioning a cursor 1025 over the cell, the user clicking on the cell, or the like. In some implementations, the selection of a cell can be denoted by positioning a visual indicia such a perimetrical highlight 1030 in or around the cell.

In the illustrated implementation, selected cell 1020 does not include a value 307 at the time of selection. There can be several reasons for this. For example, structured presentation 1000 can be a new structured presentation that has not yet been populated with values. As another example, structured presentation 1000 can be a preexisting structured presentation from which a value has been deleted. As yet another example, structured presentation 1000 can be a preexisting structured presentation that drew a former value from a source document which, for some reason, is no longer operable as a source of a value.

Figure 11:
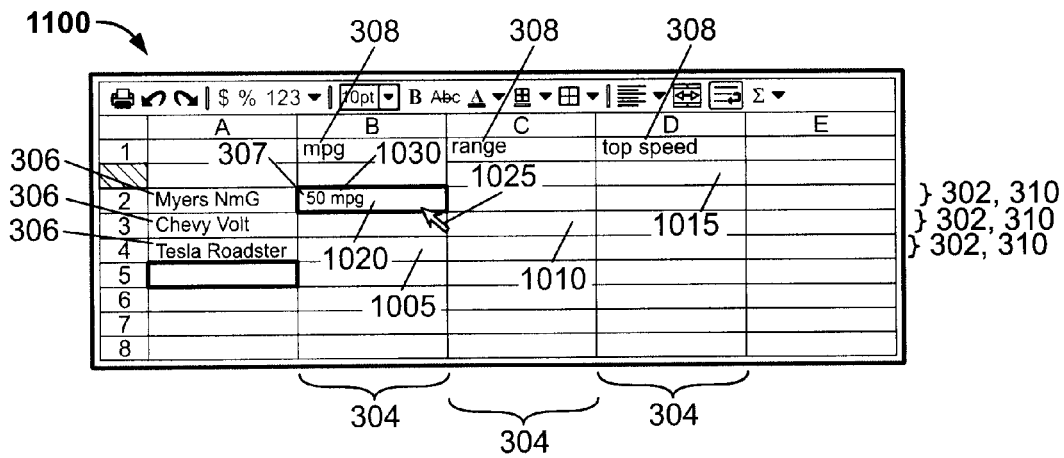

FIG. 11 is a schematic representation of another structured presentation 1100 in which a search interface is concealed. In contract with structured presentation 1000, structured presentation 1100 includes a value 307 in selected cell 1020. There can be several reasons for this. For example, cell 1020 can have been populated with value 307 automatically, e.g., in response to receipt of a search query. As another example, cell 1020 can have been populated by a user manually interacting with cell 1020 to enter a value. As yet another example, cell 1020 can have been populated with value 307 in response to user specifying—either inherently or manually—an instance, an attribute, or both that are associated with cell 1020. In any case, selection of cell 1020 specifies the instance identified as "Myers NmG" and the attribute identified as "mpg" that are associated therewith.

Figure 12:
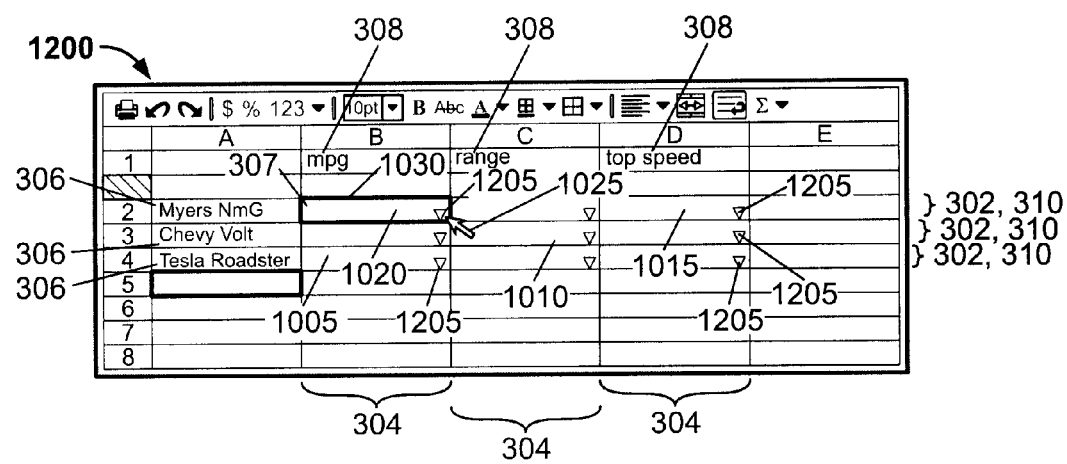

FIG. 12 is a schematic representation of another structured presentation 1200 in which a search interface is concealed. Structured presentation 1200 includes visual indicia 1205. Visual indicia 1205 visually indicate that concealed search information or interactive elements are accessible from structured presentation 1200.

In the illustrated implementation, each visual indicium 1205 is found in a separate cell, such as cells 1005, 1010, 1015, 1020. The positioning and arrangement of visual indicia 1205 in cells—and concomitantly the positioning and arrangement of visual indicia 1205 relative to instance identifiers 306 and attribute identifiers 308 in rows 302 and columns 304—can visually indicate the relevance and function of concealed search information and interactive elements, as discussed further below.

In operation, user interaction with structured presentations 1000, 1100, 1200 can trigger the presentation of a concealed search interface. As discussed above, a search interface can include search information, search interactive elements, or both. A search interface can be concealed in a structured presentation in that the search information and interactive elements need not always be discernible in the structured presentation. Rather, a concealed search interface can be concealed wholly or partially from view while a structured presentation is in certain states. For example, in states where a viewer is likely to be reviewing the other information content of a structured presentation, a concealed search interface can be concealed. Such concealment can increase the portion of the structured presentation that is available for the presentation of the other information and reduce visual clutter to improve the readability of the structured presentation.

Figure 13:
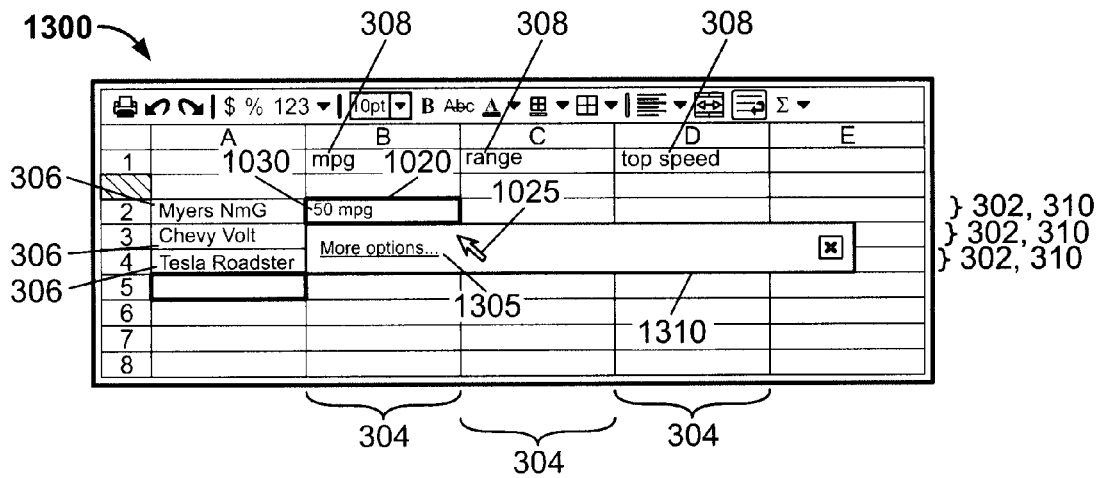
FIGS. 13-18 illustrate display elements in which formerly concealed search interfaces are presented.

FIG. 13 illustrates a display element 1300 in which a formerly concealed search interface is presented. In some implementations, display element 1300 can be presented in response to user interaction with the structured presentation itself. Display element 1300 can "pop-up" in front of a structured presentation (such as structured presentations 1000, 1100, 1200) to present a search interactive element 1305 in a window 1310 in response to user interaction with cell 1020. For example, search interactive element 1305 and window 1310 can be presented in response to a user clicking on cell 1020 using a mouse. Search interactive element 1305 is a hyperlink that includes text indicating that "more options . . . " may be available for populating cell 1020.

Figure 14:
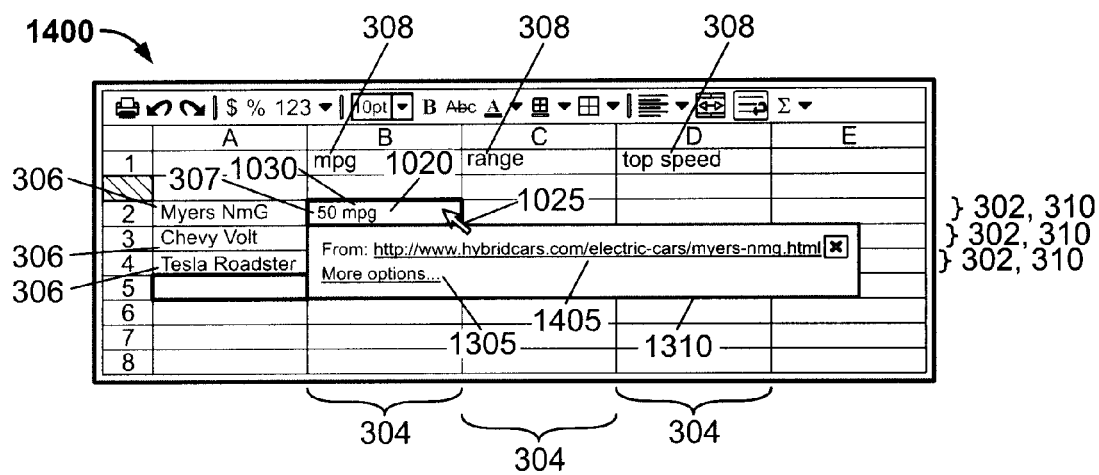

FIG. 14 illustrates a display element 1400 in which a formerly concealed search interface is presented. In some implementations, display element 1400 can be presented in response to user interaction with the structured presentation itself. In addition to search interactive element 1305, display element 1400 presents a source identifier 1405 in window 1310 in response to user interaction with cell 1020. Source identifier 1405 includes text or other information that identifies an electronic document that is a source of the value 307 populating cell 1020. The source document identified by source identifier 1405 can be a document that was located as a result of a prior search. In some implementations, source identifier 1405 can also include a hyperlink to the source document.

Figure 15:
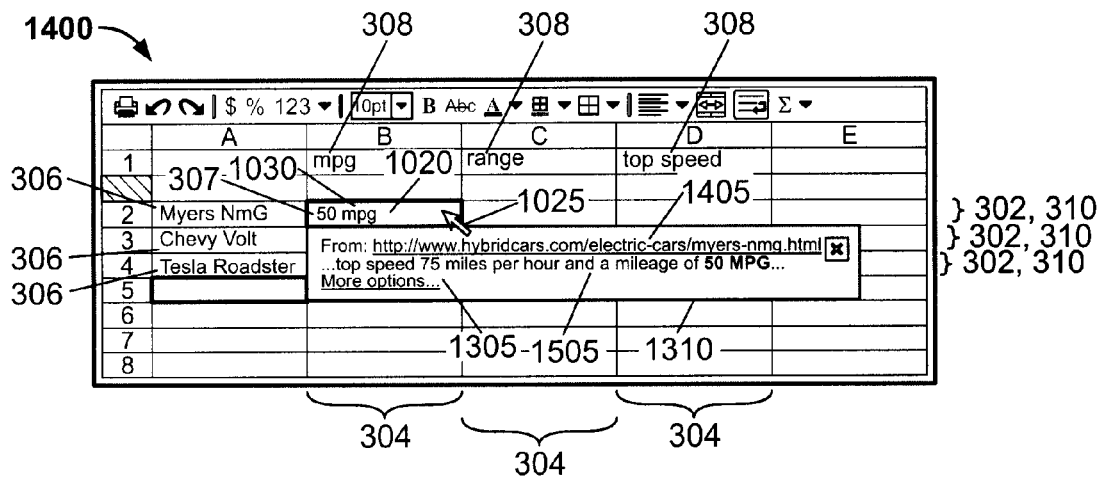

FIG. 15 illustrates a display element 1500 in which a formerly concealed search interface is presented. In some implementations, display element 1500 can be presented in response to user interaction with the structured presentation itself. In addition to search interactive element 1305 and source identifier 1405, display element 1500 presents a snippet 1505 in window 1310 in response to user interaction with cell 1020. Snippet 1505 is text or other information that describes the context of value 307 in an electronic document that is a source of the value 307 populating cell 1020.

Figure 16:
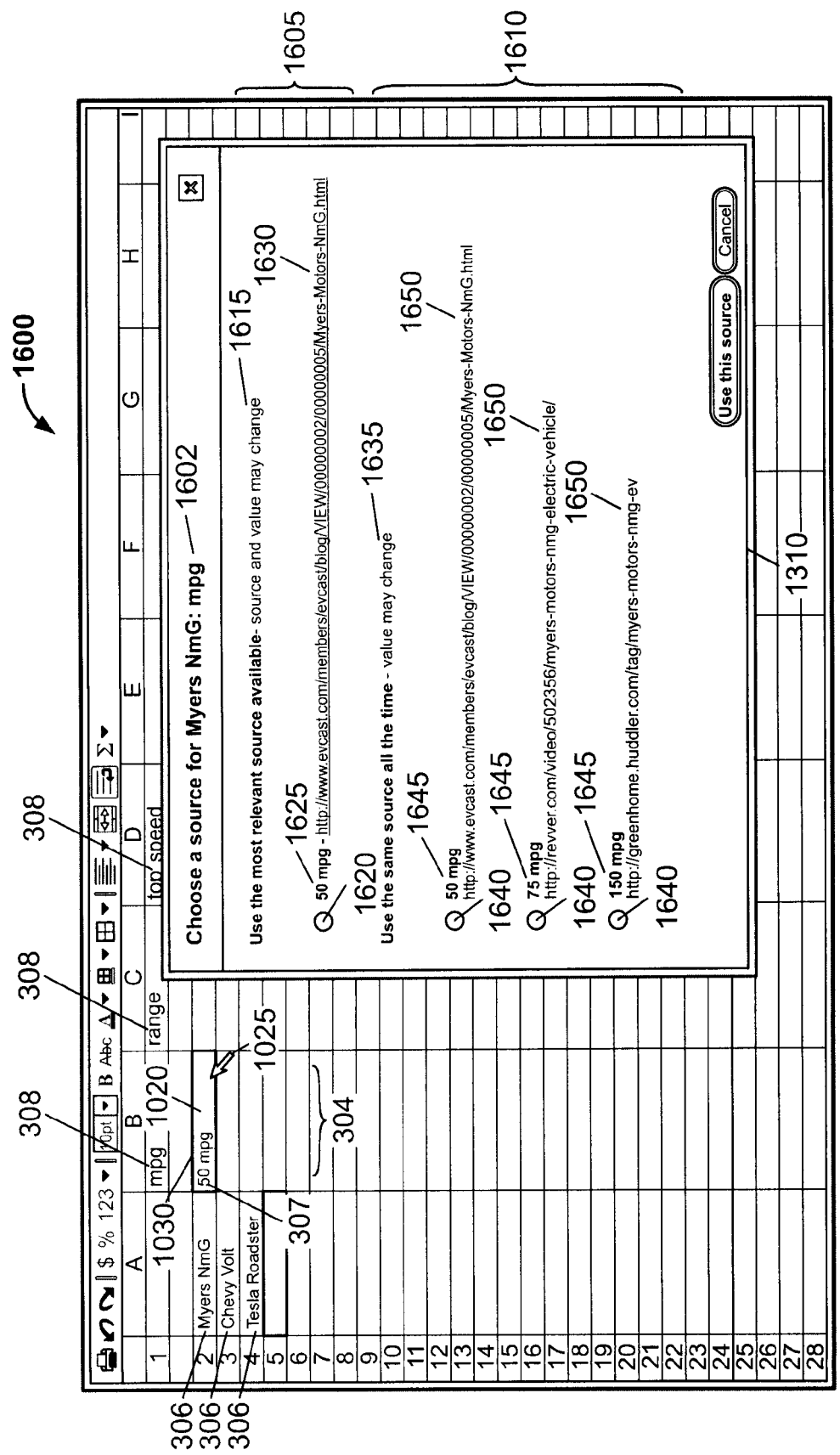

FIG. 16 illustrates a display element 1600 in which a formerly concealed search interface is presented. In some implementations, display element 1600 can be presented in response to user interaction with the structured presentation itself or in response to user interaction with a formerly concealed search interactive element 1305. Display element 1600 includes a header 1602, a relevant source selection region 1605, and a consistent source selection region 1610. Header 1602 can include text or other information that identifies a cell to which a value is to be added. In the illustrated implementation, cell 1030 is identified by the attribute and value (i.e., Myers NmG: mpg) that are characterized by the value 307 in cell 1030.

Relevant source selection region 1605 can include information and interactive elements that allow a user to specify that the relevancy of a source electronic document to a specified instance and attribute is to be used in selecting a value that is to be populated a structured presentation. In the illustrated implementation, the user can specify that a single "most relevant" document is to be the sole source of a value that is to populate a structured presentation. The relevancy of a document can characterize how closely a the document matches, e.g., an attribute and an instance that define a search.

In the illustrated implementation, relevant source selection region 1605 includes a header 1615, a selection widget 1620, a value identifier 1625, and a source identifier 1630. Header 1615 includes text or other information that identifies that relevant source selection region 1605 allows a user to specify that the most relevant electronic document is to be used as the source of the value populating the cell identified in header 1602. Selection widget 1620 allows a user to select the use of the most relevant document as the source of the value populating the structured presentation. Value identifier 1625 includes text or other information that identifies the value drawn from the currently most relevant document. Source identifier 1630 includes text or other information that identifies the currently most relevant electronic document. In some implementations, source identifier 1630 can also include a hyperlink to the currently most relevant document. Since the most relevant document can change over time, the value identified by value identifier 1625 and the document identified by source identifier 1630 can also change over time.

Consistent source selection region 1610 can include information and interactive elements that allow a user to specify that a source electronic document is to be used consistently in selecting a value that is to populate a structured presentation. In the illustrated implementation, the user can select from among three candidate documents to specify that document that is to be consistently used as the source of a value that is to populate a structured presentation.

In the illustrated implementation, consistent source selection region 1610 includes a header 1635, a collection of selection widgets 1640, a collection of value identifiers 1645, and a collection of source identifiers 1650.

Header 1635 includes text or other information that identifies that relevant source selection region 1605 allows a user to specify that a source electronic document is to be used consistently in selecting a value. Selection widgets 1640 allow a user to select the document that is to consistently be used. In the illustrated implementation, the user can select from among three different documents. Value identifiers 1645 include text or other information that identifies the current values that can be drawn from particular documents to populate a structured presentation. Source identifiers 1650 include text or other information that identifies the electronic documents from which the values identified by value identifiers 1625 are drawn. In some implementations, source identifiers 1650 can also include hyperlinks to the electronic documents from which the values identified by value identifiers 1625 are drawn.

Both the relevancy of an electronic document and the value in an electronic document can change over time. For example, the person who adds an electronic document to an electronic document collection can change the content of the electronic document so that the relevancy of that document to an instance and attribute changes. As another example, the person who adds an electronic document to an electronic document collection can change the value that is used to characterize an attribute of an instance. Headers 1615, 1635 can include text or other information identifying the nature of the changes that can occur. For example, in the illustrated implementation, header 1615 includes text identifying that both the most relevant document and the value of an attribute can change when the user specifies that the relevancy of a source electronic document to a specified instance and attribute is to be used in selecting a value that is to populate a structured presentation. As another example, in the illustrated implementation, header 1635 includes text stating that the value of an attribute can change when the user specifies that a source electronic document is consistently to be used in selecting a value that is to populate a structured presentation.

Figure 17:
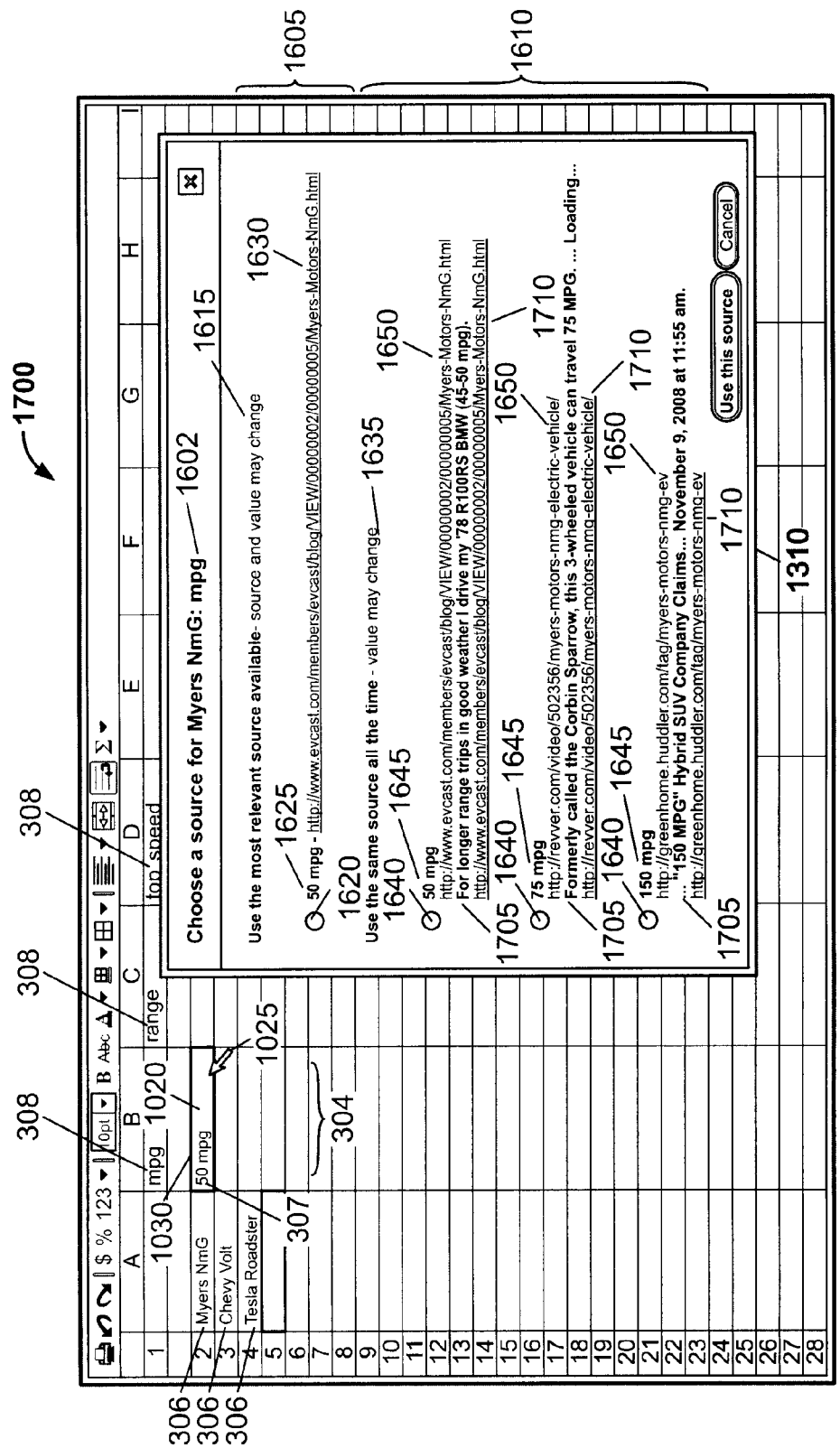

FIG. 17 illustrates a display element 1700 in which a formerly concealed search interface is presented. In some implementations, display element 1700 can be presented in response to user interaction with the structured presentation itself or in response to user interaction with a formerly concealed search interactive element 1305. In addition to headers 1602, 1615, 1635, selection widgets 1620, 1640, value identifiers 1625, 1645, and source identifiers 1630, 1650, display element 1700 includes a collection of snippets 1705 and a collection of search interactive elements 1710. Each snippet 1705 is text or other information that describes the context of the respective values identified by value identifiers 1625, 1645 in an electronic document that is a source of the identified value. Search interactive elements 1710 are hyperlinks that allow a user to navigate to the respective electronic document that is the source of the value identified by the respective value identifier 1645.

Figure 18:
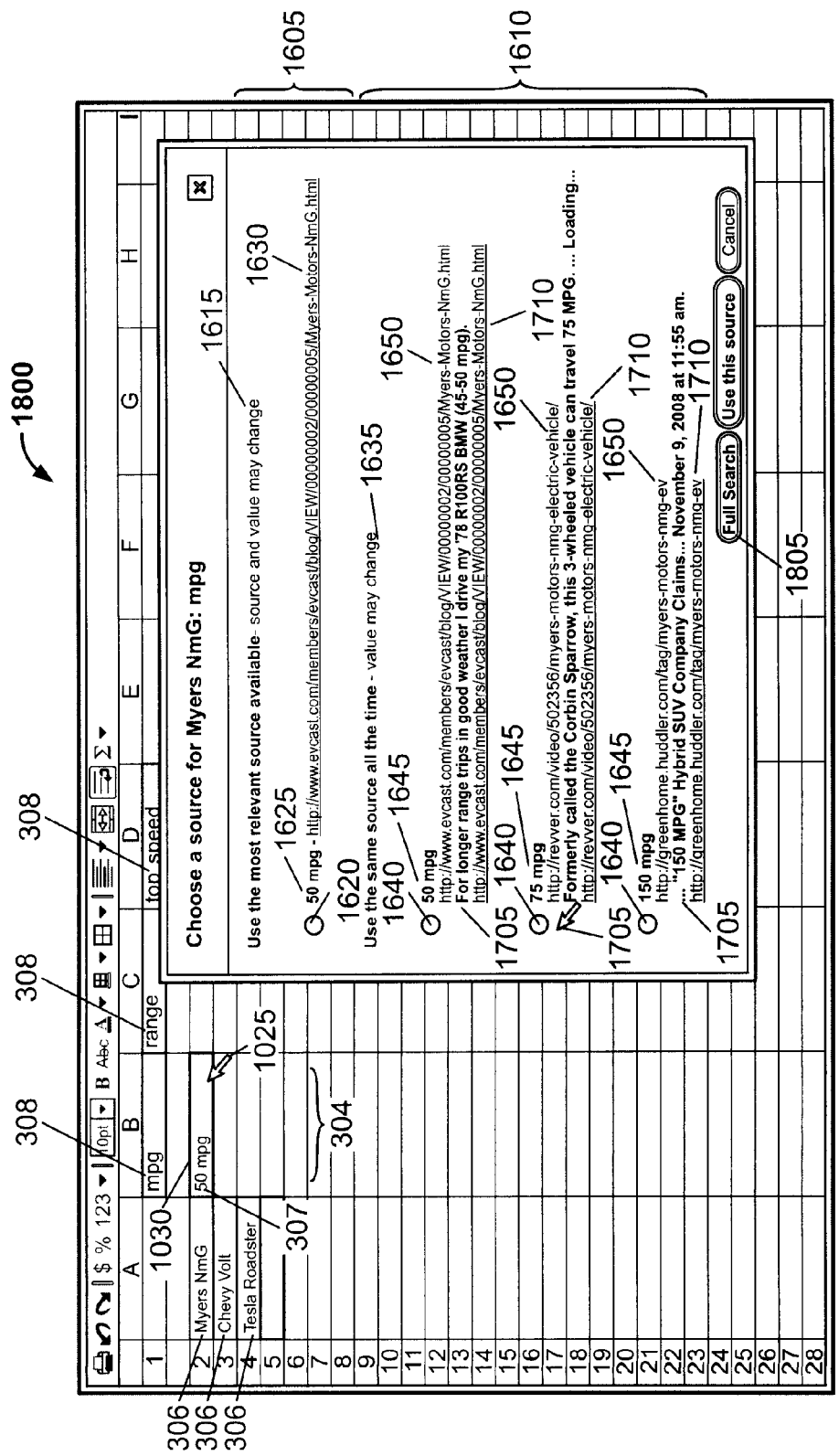

FIG. 18 illustrates a display element 1800 in which a formerly concealed search interface is presented. In some implementations, display element 1800 can be presented in response to user interaction with the structured presentation itself or in response to user interaction with a formerly concealed search interactive element 1305. In addition to headers 1602, 1615, 1635, selection widgets 1620, 1640, value identifiers 1625, 1645, source identifiers 1630, 1650, snippets 1705, and search interactive elements 1710, display element 1700 includes a search trigger 1805. Search trigger 1805 is an interactive element that triggers a search of an electronic document collection. When displayed alongside descriptions of the results of previous searches (such as value identifiers 1625, 1645, source identifiers 1630, 1650, snippets 1705, and search interactive elements 1710), search trigger 1805 can allow a user to indicate dissatisfaction with the results of the previous searches. In some implementations, the search triggered by search trigger 1805 can be a "full search" that is conducted using a general purpose search engine such as the Google™ search engine. In some implementations, the search engine can be presented with a query that is automatically generated using the instance and attribute specified by previous user interaction.

As shown in FIGS. 13-18, the nature of the user interaction that triggers the display of formerly concealed search information and interactive elements can determine the category of the search information and interactive elements that are displayed. For example, user interaction specifying a single cell in a structured presentation can trigger presentation of search information and interactive elements that are relevant to populating that same cell with values. In other implementations, user interaction with a column, a row, or other collection of cells can trigger presentation of search information and interactive elements that are relevant to populating that collection of cells with values. For example, user interaction with a column can allow a user to specify that the values populating that column are to be consistently drawn from a single source document or family of source documents. As another example, user interaction with a row can allow a user to specify that the values populating that row are to be drawn from the source document is most relevant to an instance and the attributes of that row.

Figure 19:
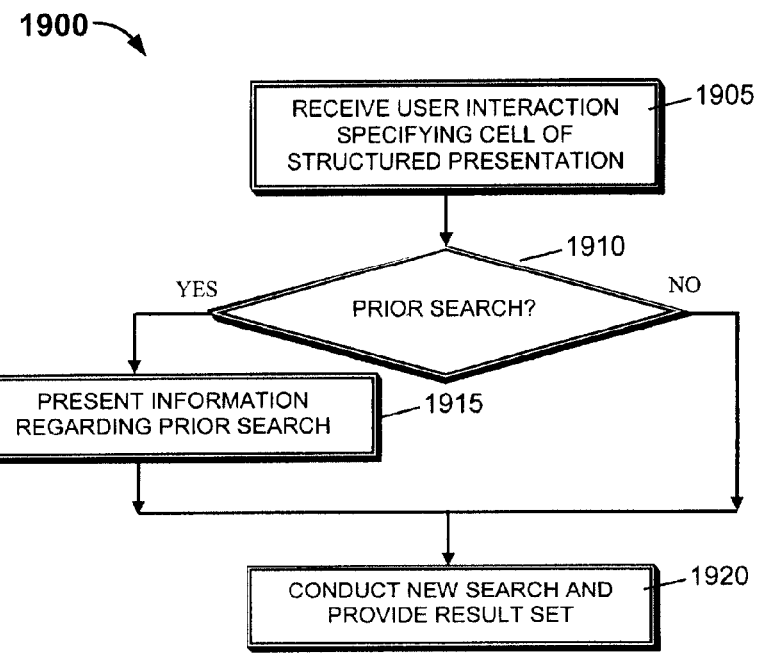
FIG. 19 is a flow chart of a process for adding values to a structured presentation by drawing the values from the content of documents in an electronic document collection.

FIG. 19 is a flow chart of a process 1900 for adding values to a structured presentation by drawing the values from the content of documents in an electronic document collection. Process 1900 can be performed by a system of one or more computers that perform operations by executing one or more sets of machine-readable instructions. For example, process 1900 can be performed by the search engine 202 in system 200. Process 1900 can be performed in isolation or in conjunction with other activities. For example, process 1900 can be performed as part of steps 905, 915, and 920 of process 900 (FIG. 9).

The system performing process 1900 can receive data characterizing a user interaction specifying one or more cells of a structured presentation (step 1905). The structured presentation can be a new or a preexisting structured presentation. The interaction with one or more cells can concomitantly specify one or more attributes and instances, as discussed above.

The system performing process 1900 can determine whether or not one or more values populating the one or more cells resulted from a prior search of an electronic document collection (step 1910). Such a determination can be made by accessing a data storage device that stores information characterizing not only the information that is visibly displayed in a structured presentation but also information characterizing any prior search conducted to populate the structured presentation. The stored information characterizing the prior search can include, e.g., an indication that a search was indeed conducted, URLs of source document in the result set of the prior search, and snippets characterizing the context of the values in the source documents.

If the system performing process 1900 determines that a value resulted from a previous search, the system can present search information characterizing the prior search (step 1915). Such information can include, e.g., information identifying a source document in the result set from which a value was drawn, a snippet characterizing the context of the value in a source document, and a hyperlink to the source document. For example, the system can present search information characterizing a single source document in presentations such as display elements 1400, 1500 (FIGS. 14, 15). As another example, the system can present search information regarding multiple source documents—including source documents having values different from those visibly populating a structured presentation—in presentations such as display elements 1600, 1700, 1800 (FIGS. 16, 17, 18).

In some implementations, the system performing process 1900 can transition between presentation of search information regarding a single source document and search information regarding multiple source documents in response to interaction with a user. For example, the system can receive user interaction with an search interactive element such as search interactive element 1305 and transition between display elements 1400, 1500 and display elements 1600, 1700, 1800 (FIGS. 13-18).

In some implementations, the system performing process 1900 can also conduct a new search and provide information characterizing one or more electronic documents in the result set yielded by the new search (step 1920). The characterizing information can include, e.g., names and URLs of the electronic documents, snippets of the electronic documents, summaries of the electronic documents, or the like. The result set can characterize a single source document in presentations such as display elements 1400, 1500 (FIGS. 14, 15) or multiple source documents in presentations such as display elements 1600, 1700, 1800 (FIGS. 16, 17, 18). In some implementations, the system can transition between presentation of search information regarding a single source document and search information regarding multiple source documents in response to interaction with a user. For example, the system can receive user interaction with an search interactive element such as search interactive element 1305 and transition between display elements 1400, 1500 and display elements 1600, 1700, 1800 (FIGS. 13-18).

Figure 20:
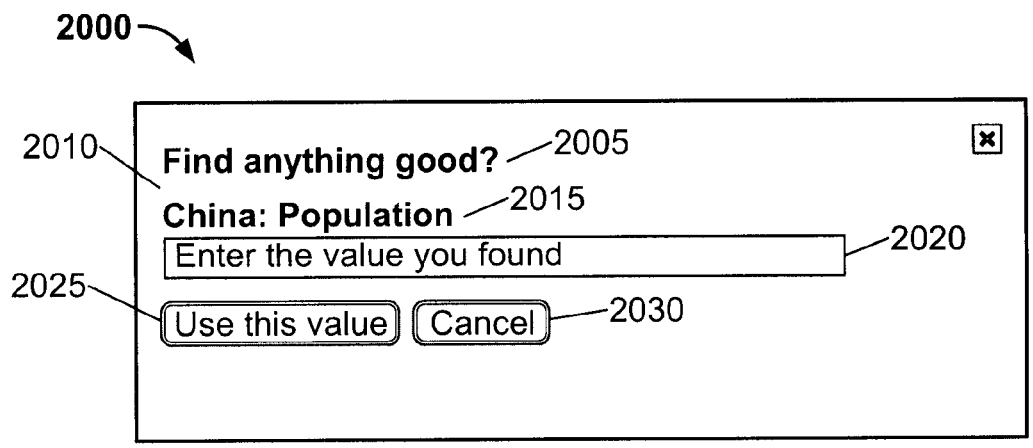
FIGS. 20, 21, and 22 illustrate display elements in which formerly concealed search interfaces presented.

FIG. 20 illustrates a display element 2000 in which a formerly concealed search interface is presented. In some implementations, display element 2000 can be presented in response to user interaction with the structured presentation itself or in response to user interaction with a formerly concealed search interactive element 1805. Display element 2000 can receive a value that results from a search, such as a search conducted using a general purpose search engine. The value received by display element 2000 can be added into a structured presentation to characterize an attribute of an instance. Display element 2000 includes a header 2005, an instance identifier 2010, an attribute identifier 2015, a value entry element 2020, a value use trigger element 2025, and a presentation close element 2030.

Header 2005 is text or other information that describes that display element 2000 can receive a value of an attribute of an instance. Header 2005 can also prompt the user to enter a value resulting from a search. For example, header 2005 can be text asking if a search was successful.

Instance identifier 2010 is text or other information that identifies an instance, or a category of instances, that is to be characterized by the value entered using presentation 2000. In the illustrated implementation, instance identifier 2010 is text identifying the instance "China." Attribute identifier 2015 is text or other information that identifies an attribute of the instance identified by instance identifier 2010. The attribute identified by attribute identifier 2015 can be characterized by the value received by presentation 2000. In the illustrated implementation, attribute identifier 2015 is text identifying the attribute "Population." Together, instance identifier 2010 and attribute identifier 2015 identify that the population of China is to be characterized by a value received using presentation 2000.

Value entry element 2020 is an interactive element that allows a user to specify a value characterizing the attribute identified by attribute identifier 2015 of the instance identified by instance identifier 2010. Value entry element 2020 can be, e.g., a text entry field.

Value use trigger element 2025 is an interactive element that allows a user to trigger the use of a value entered in value entry element 2020 to characterize the attribute identified by attribute identifier 2015 of the instance identified by instance identifier 2010 in a structured presentation. Value use trigger element 2025 can be, e.g., a button that includes text identifying that user interaction with value use trigger element 2025 will result in the value entered in value entry element 2020 being used in a structured presentation.

Presentation close element 2030 is an interactive element that allows a user to close display element 2000. In response to user interaction with presentation close element 2030, display element 2000 can be closed regardless of whether the value entered in value entry element 2020 is used, in a structured presentation, to characterize the attribute identified by attribute identifier 2015 of the instance identified by instance identifier 2010. Presentation close element 2030 can be, e.g., a button that includes text identifying that user interaction with presentation close element 2030 will close display element 2000.

Figure 21:
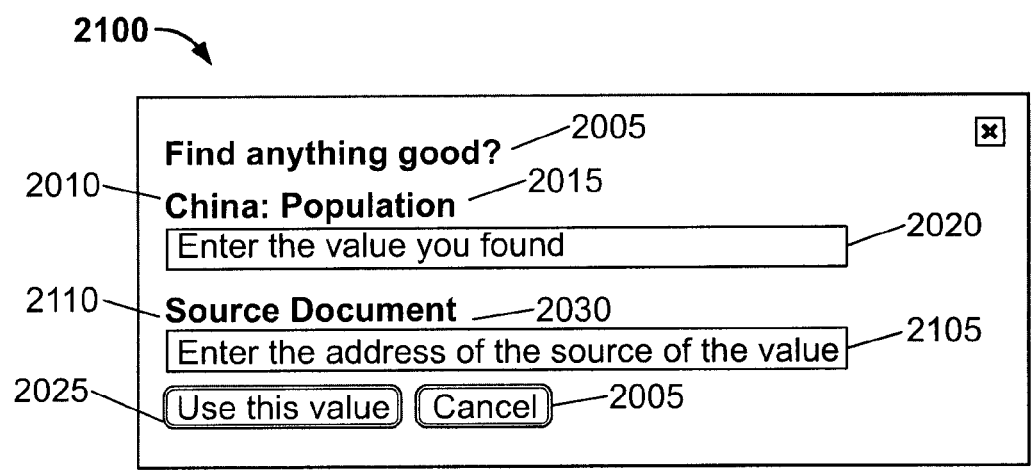

FIG. 21 illustrates a display element 2100 in which a formerly concealed search interface is presented. In some implementations, display element 2100 can be presented in response to user interaction with the structured presentation itself or in response to user interaction with a formerly concealed search interactive element 1805. Display element 2100 can receive a value of an attribute of an instance to be added into a structured presentation. In addition to header 2005, instance identifier 2010, attribute identifier 2015, value entry element 2020, value use trigger element 2025, and presentation close element 2030, display element 2100 includes a source entry element 2105 and a source entry element identifier 2110.

Source entry element 2105 is an interactive element that allows a user to specify a source of a value characterizing the attribute identified by attribute identifier 2015 of the instance identified by instance identifier 2010. Source entry element 2020 can be, e.g., a text entry field. Source entry element identifier 2110 is text or other information that describes that source entry element 2105 can be used to specify a source of the value.

In some implementations, display elements 2000, 2100 can be displayed for a user on a display screen after an unsuccessful search. For example, display elements 2000, 2100 can be displayed in response to receipt of an indication from a user that the user is dissatisfied with the results of a previous search. For example, the display of display elements 2000, 2100 can be triggered by user interaction with search trigger 1805 (FIG. 18). As another example, display elements 2000, 2100 can be displayed after an automatic search for values of an attribute of an instance has provided unsatisfactory results.

There are many reasons why a search for values can provide unsatisfactory results. For example, an attribute, and instance, or both may be improperly specified, e.g., due to a misspelling or other error. As another example, an attribute or an instance can be specified without error but relative to an unknown or indefinite value. For example, the instance "suitable for Jim and Diane" is specified relative to indefinite values, namely, the identity of Jim and Diane, as well as the nature of what is "suitable" for them. As another example, the instance "my car" is specified relative to an indefinite value, namely, the identity of the person whose car is to be characterized.

A search for values can also provide unsatisfactory results because an electronic document that resulted from a prior search is inoperative to provide a value for the structured presentation. For example, a source document from which a value is to be drawn can become unavailable. A source document can become unavailable, e.g., when the party who had added the source document withdraws it from an electronic document collection. As yet another example, such a source document can remain available but the value itself can become unavailable in the source document. A value can become unavailable, e.g., when the party who added a source document to an electronic document collection changes the content of the source document.

Figure 22:
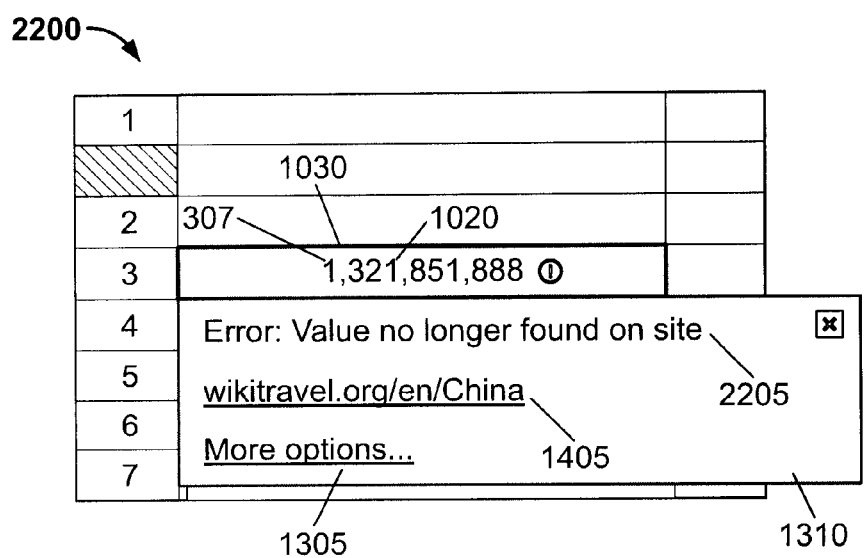

FIG. 22 illustrates a display element 2200 in which a formerly concealed search interface is presented. Display element 2200 can be presented in response to use interaction or automatically in response to a triggering event. For example, display element 2200 can be presented automatically in response to a prior search becoming inoperative.

Display element 2200 includes a search interactive element 1305, a source identifier 1405, and an error message 2205 in a window 1310. Search interactive element 1305 is a hyperlink that includes anchor text indicating that "more options . . ." are available for searching for values to populate cell 1020. Source identifier 1405 is a collection of text that identifies an electronic document that is to be a source of value 307 populating cell 1020.

Error message 2205 can include text or other information indicating that the results of a prior search have been rendered inoperative. For example, error message 2205 can indicate that value 307 has become unavailable in the source document identified by source identifier 1405. Error message 2205 can include information describing the nature of the inoperativeness or simply indicating that an error has occurred. For example, in the illustrated implementation, error message 2205 indicates that the value is no longer available within an electronic document that itself remains available.

Figure 23:
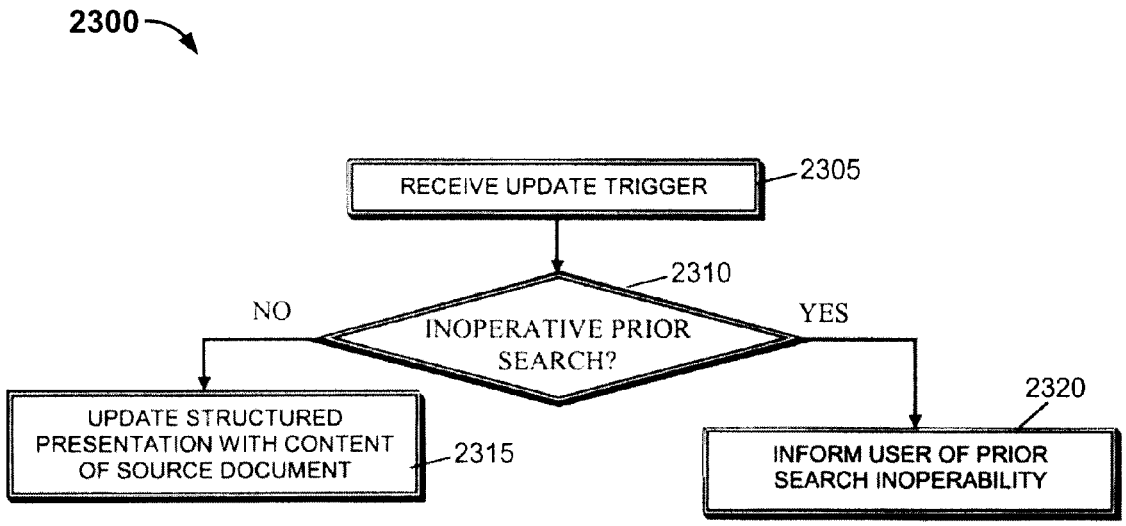
FIG. 23 is a flow chart of a process for adding values to a structured presentation based on the content of documents in an electronic document collection.

FIG. 23 is a flow chart of a process 2300 for adding values to a structured presentation based on the content of documents in an electronic document collection. Process 2300 can be performed by a system of one or more computers that perform operations by executing one or more sets of machine-readable instructions. For example, process 2300 can be performed by the search engine 202 in system 200. Process 2300 can be performed in isolation or in conjunction with other activities. For example, process 1900 can be performed as part of process 900 (FIG. 9).

The system performing process 2300 can receive an update trigger triggering an update of the one or more values of one or more cells of a preexisting structured presentation (step 2305). The update trigger can be, e.g., generated automatically in response to the passage of a period of time since a previous update, manually in response to user interaction, or the like. For example, user interaction with a cell 1020 (FIGS. 10, 11, 12) can trigger the update of that cell, as discussed above. The update trigger can trigger the update of the value or a single cell, the value of a collection of cells, or the values of all the cells in a structured presentation. The update trigger in can concomitantly specify one or more attributes of one or more instances, as discussed above.

The system performing process 2300 can determine whether or not one or more prior searches for populating the structured presentation with values has become inoperative (step 2310). Such a determination can be made by seeking to access documents from which the values populating the structured presentation are to be drawn.

If the system performing process 1900 determines that a prior search has not become inoperative, the system can update a structured presentation with the content of one or more source documents identified in the prior search (step 2315). A new values used to update the structured presentation need not be identical to a value previously used to populate the structured presentation. Rather, the updated structured presentation can include a value provided by the source electronic document with its current content.

If the system performing process 1900 determines that a prior search has become inoperative, the system can inform the user of the inoperability of the prior search (step 2320). For example, a display element such as display element 2200 can be used to inform the user of the operability and provide the user with the opportunity to conduct a new search to populate the structured presentation with values. In some implementations, the system can also conduct a new search and provide information characterizing one or more electronic documents in the result set yielded by the new search, as described in reference to step 1920 of process 1900 (FIG. 19).

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal that is generated to encode information for transmission to suitable receiver apparatus for execution by data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, or declarative or procedural languages, and it may be deployed in any form, including as a stand alone program or as a module, component, subroutine, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processor suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter described in this specification have been described. Other embodiments are within the scope of the following claims. For example, the actions recited in the claims may be performed in a different order and still achieve desirable results. As one example, the processes depicted in the accompanying figures do not necessarily require the particular order shown, or sequential order, to achieve desirable results. Accordingly, other implementations are within the scope of the following claims.

What is claimed is:

1. A system comprising:
   one or more computers programmed to interact with client devices and to perform operations comprising:
   receiving a search query;
   providing a structured presentation for display on a display device responsive to the search query, the structured presentation visually presenting information in a systematic and structured arrangement that conforms with a structured design, the structured presentation denoting associations between an instance and values that characterize attributes of an entity corresponding to the instance using an arrangement of the values in respective cells of the structured presentation, wherein one or more values of in the respective cells are populated from one or more electronic documents identified from a search of an unstructured collection of electronic documents;
   receiving a user interaction with a first cell of the structured presentation, the first cell having a first value for a particular attribute of an instance associated with the first cell; and
   in response to the received user interaction with the first cell:
      determining that the first value of the first cell provided in the structured presentations resulted from a prior search of the unstructured collection of electronic documents that identified one or more particular electronic documents as including content characterizing the particular attribute of the instance, wherein the first value was determined from the content of the one or more particular electronic documents; and
      in response to determining that the prior search was conducted, providing information regarding the prior search including providing a search interface associated with the first value of the first cell for presentation on the display device, the search interface configured to present search result information characterizing the prior search including providing information identifying a first electronic document of the particular electronic documents from which the first value for the attribute of the instance was determined including providing for display a link to the first electronic document.

2. The system of claim 1, wherein the user interaction with the first cell comprises receiving data characterizing a manual user specification of the first instance and the first attribute that are associated with the first cell.

3. The system of claim 1, wherein the operations further comprise providing information identifying a plurality of electronic documents from which the first value could have been determined in response to determining that the prior search was conducted.

4. The system of claim 1, wherein the operations further comprise providing the information identifying the electronic document in a display element of the search interface, wherein the search interface was concealed wholly or partially from view in the display of the structured presentation on the display screen prior to the user interaction with the first cell.

5. The system of claim 1, wherein the operations further comprise:
   determining that the electronic document is inoperable to provide the first value; and
   displaying a visual indication of the inoperability of the electronic document.

6. The system of claim 1, wherein the operations further comprise updating a display of the value in the first cell of the structured presentation in response to the user interaction.

7. The system of claim 1, wherein the operations further comprise providing a snippet characterizing a context of the first value in the electronic document of the electronic document collection in response to determining that the prior search was conducted.

8. The system of claim 7, wherein:
   the unstructured collection of electronic documents comprises electronic documents available on the Internet; and
   the electronic documents comprise web pages.

9. The system of claim 1, wherein the structured presentation comprises a collection of cards.

10. The system of claim 1, wherein providing information regarding the prior search further includes providing information identifying multiple source electronic documents of the collection of electronic documents including one or more electronic documents having different values from the first value.

11. The system of claim 1, comprising performing a new search in response to determining that the first value of the first cell resulted from the prior search and providing information characterizing one or more electronic documents returned by the new search.

12. A method, comprising:

receiving a search query;

providing a structured presentation for display on a display device responsive to the search query, the structured presentation visually presenting information in a systematic and structured arrangement that conforms with a structured design, the structured presentation denoting associations between an instance and values that characterize attributes an entity corresponding to of the instance using an arrangement of the values in respective cells of the structured presentation responsive to the search query;

receiving a user interaction with a first cell of the structured presentation, the first cell having a first value for a particular attribute of an instance associated with the first cell; and in response to the received user interaction with the first cell:

determining that the first value of the first cell provided in the structured presentations resulted from a prior search of the unstructured collection of electronic documents by a system comprising one or more computers that identified one or more particular electronic documents as including content characterizing the particular attribute of the instance, wherein the first value was determined from the content of the one or more particular electronic documents; and in response to determining that the prior search was conducted, providing information regarding the prior search including providing a search interface associated with the first value of the first cell for presentation on the display device, the search interface configured to present search result information characterizing the prior search including providing information identifying a first electronic document of the particular electronic documents from which the first value for the attribute of the instance was determined including providing for display a link to the first electronic document.

13. The method of claim 12, wherein the user interaction with the first cell comprises receiving data characterizing a manual user specification of the first instance and the first attribute that are associated with the first cell.

14. The method of claim 12, further comprising identifying a collection of electronic documents from which the first value could have been determined.

15. The method of claim 12, wherein providing the second identifier identifying the first of the electronic documents comprises providing the information for display in a display element of the search interface, wherein the search interface was concealed wholly or partially from view in the display of the structured presentation on the display screen prior to the user interaction with the first cell.

16. The method of claim 12, further comprising:

determining that a second electronic document is inoperable to provide the first value; and providing for display a visual indication of the inoperability of the second electronic document.

17. The method of claim 12, further comprising:

updating a display of a value in the first cell of the structured presentation in response to the user interaction.

18. The method of claim 12, further comprising displaying a snippet characterizing a context of the first value in a first document of the electronic document collection.

19. The method of claim 18, wherein:

the collection of electronic documents comprises electronic documents available on the Internet; and the electronic documents comprise web pages.

20. The method of claim 12, wherein the structured presentation comprises a collection of cards.

21. A non-transitory computer storage medium encoded with instructions that when executed by one or more computers cause the one or more computers to perform operations comprising:

receiving a search query;

providing a structured presentation for display on a display device responsive to the search query, the structured presentation visually presenting information in a systematic and structured arrangement that conforms with a structured design, the structured presentation denoting associations between an instance and values that characterize attributes of an entity corresponding to the instance using an arrangement of the values in respective cells of the structured presentation, wherein one or more values of in the respective cells are populated from one or more electronic documents identified from a search of an unstructured collection of electronic documents;

receiving a user interaction with a first cell of the structured presentation, the first cell having a first value for a particular attribute of an instance associated with the first cell; and in response to the received user interaction with the first cell:

determining that the first value of the first cell provided in the structured presentations resulted from a prior search of the unstructured collection of electronic documents by a system comprising one or more computers that identified one or more particular electronic documents as including content characterizing the particular attribute of the instance, wherein the first value was determined from the content of the one or more particular electronic documents; and in response to determining that the prior search was conducted, providing information regarding the prior search including providing a search interface associated with the first value of the first cell for presentation on the display device, the search interface configured to present search result information characterizing the prior search including providing information identifying a first electronic document of the particular electronic documents from which the first value for the attribute of the instance was determined including providing for display a link to the first electronic document.

22. The computer storage medium of claim 21, the user interaction with the first cell comprises receiving data characterizing a manual user specification of the first instance and the first attribute that are associated with the first cell.

23. The computer storage medium of claim 21, wherein the wherein the operations further comprise providing information identifying a collection of electronic documents from which the first value could have been determined.

24. The computer storage medium of claim 21, wherein providing information identifying the electronic document from which the first value was determined comprises providing the information for display in a display element of the search interface that was concealed wholly or partially from view in the display of the structured presentation on the display screen prior to the user interaction with the first cell.

25. The computer storage medium of claim 21, wherein the operations further comprise:
- determining that a second electronic document is inoperable to provide the first value; and
- providing for display a visual indication of the inoperability of the second electronic document.

26. The computer storage medium of claim 21, wherein the operations further comprise updating a display of a value in the first cell of the structured presentation in response to the user interaction.

27. The computer storage medium of claim 21, wherein the operations further comprise displaying a snippet characterizing a context of the first value in a first document of the electronic document collection.

28. The computer storage medium of claim 27, wherein:
- the collection of electronic documents comprises electronic documents available on the Internet; and
- the electronic documents comprise web pages.

29. The computer storage medium of claim 21, wherein structured presentation comprises a collection of cards.

30. A system, comprising:
- a user device comprising a display device;
- one or more computers programmed to interact with the user device and to perform operations comprising:
  - receiving a search query:
  - providing a structured presentation for display on the display device responsive to the search query, the data specifying a first cell of the structured presentation displayed, the structured presentation visually presenting information in a systematic and structured arrangement that conforms with a structured design, the structured presentation denoting associations between an instance and values that characterize attributes of an entity corresponding to the instance using an arrangement of the values in respective cells of the structured presentation, wherein one or more values of in the respective cells are populated from one or more electronic documents identified from a search of an unstructured collection of electronic documents;
  - receiving a user interaction with a first cell of the structured presentation, the first cell having a first value for a particular attribute of an instance associated with the first cell; and
  - in response to the received user interaction with the first cell:
    - determining, in response to receipt of the data characterizing the user interaction, that the first value of the first cell provided in the structured presentations resulted from a prior search of the unstructured collection of electronic documents by the one or more computers that identified one or more particular electronic documents as including content characterizing the particular attribute of the instance, wherein the first value was determined from the content of the one or more particular electronic documents; and
    - in response to determining that the prior search was conducted, providing information regarding the prior search including providing a search interface associated with the first value of the first cell for presentation on the display device, the search interface configured to present search result information characterizing the prior search including providing information identifying a first electronic document of the particular electronic documents from which the first value for the attribute of the instance was determined for display on the display device including providing for display a link to the first electronic document.

\* \* \* \* \*